United States Patent
Purdy et al.

(10) Patent No.: US 11,138,524 B2
(45) Date of Patent: Oct. 5, 2021

(54) CASCADED BOOSTED PREDICTIVE MODELS

(71) Applicant: Uber Technologies, Inc., San Francisco, CA (US)

(72) Inventors: David Purdy, Millbrae, CA (US); Li Chen, Daly City, CA (US); Theodore Russell Sumers, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 891 days.

(21) Appl. No.: 15/374,765

(22) Filed: Dec. 9, 2016

(65) Prior Publication Data

US 2017/0262770 A1 Sep. 14, 2017

Related U.S. Application Data

(60) Provisional application No. 62/307,368, filed on Mar. 11, 2016.

(51) Int. Cl.
*G06N 20/20* (2019.01)
*G06N 20/00* (2019.01)
*B60W 40/09* (2012.01)

(52) U.S. Cl.
CPC ............ *G06N 20/20* (2019.01); *B60W 40/09* (2013.01); *G06N 20/00* (2019.01)

(58) Field of Classification Search
CPC .............................. B60W 40/09; G06N 20/00
See application file for complete search history.

(56) References Cited

U.S. PATENT DOCUMENTS

| 6,356,213 | B1* | 3/2002 | Huang | G06T 9/004 |
| | | | | 341/60 |
| 6,546,379 | B1* | 4/2003 | Hong | G06K 9/6256 |
| | | | | 706/14 |
| 2013/0164715 | A1* | 6/2013 | Hunt | G01S 19/13 |
| | | | | 434/65 |
| 2013/0246301 | A1* | 9/2013 | Radhakrishnan | G06Q 30/0282 |
| | | | | 705/347 |

\* cited by examiner

*Primary Examiner* — Alexey Shmatov
*Assistant Examiner* — Ahsif A. Sheikh
(74) *Attorney, Agent, or Firm* — Fenwick & West LLP

(57) ABSTRACT

Cascaded, boosted predictive models trained using distinct sets of exogenous and endogenous features are configured to predict component of performance ratings of entities. From the distinct predicted components, the second entity's rating factor can be determined. A second entity's rating factor represents the specific contribution a second entity makes to his average performance rating, as distinct from the rating that an arbitrary or hypothetical second entity would obtain.

18 Claims, 14 Drawing Sheets

CASCADED BOOSTED PREDICTIVE MODELS

CROSS REFERENCE TO RELATED APPLICATIONS

This application claims the benefit of U.S. Provisional Application No. 62/307,368, filed Mar. 11, 2016, which is hereby incorporated by reference in its entirety.

TECHNICAL FIELD

This disclosure generally relates to the field of statistical machine learning in which systems have the capability to automatically update a current set of data and relationships using data mining, and more particularly to applications of boosting classifiers.

Fields of Classification: Artificial Intelligence (Class 706), subclass 12 (Machine Learning); 707 (Data Processing), subclasses 776 (Data Mining); Cross Reference Art Collection: 905, 913 (Vehicles).

BACKGROUND

Statistical machine learning is a class of computer-implemented data analysis algorithms that identify relationships between variables (equivalently features or attributes) in complex data sets, for applications in classification, clustering, regression (prediction), ranking, and other problems. Machine learning can be either supervised (examples with known outputs are used for model development) or unsupervised. In supervised learning, ensemble methods combine multiple, typically weak models into a combined model that performs better than any of the individual models. Machine learning algorithms employ different techniques to tradeoff bias, variance, and model complexity that arise when multiple models are used. Bootstrap aggregation ("bagging") creates multiple models (typically decision tree models) on randomly selected partitions of the data, whereas random forests use both random selection of features (attributes) and data; these methods operate to create parallel models that are averaged together. Boosting methods are another approach in which a sequence of models (again, typically decisions trees) are iteratively trained (forward, stagewise training) using a common set of features to classify an instance or predict a value, but the data input into each model is weighted to emphasize the incorrectly classified examples and deemphasize the correctly weighted ones. The final model is the additive combination of the multiple models. Gradient boosting methods also use a forward, stagewise additive approach, but here each model in the sequence learns to predict the residuals of the prior model.

The present approaches to ensemble learning are intentionally agnostic as to the contextual nature of the features in the data, that is, the context in which independent features arises relative to the nature of the dependent feature being classified or predicted. For example, existing methods do not inherently take into account whether an independent feature occurs before, during, or after an event or value being classified or predicted, whether a feature is an aspect of the environment itself or the result of an actor or agent in that environment. Similarly, existing methods do not distinguish between features that are spontaneously observed and those that are intentionally elicited, or between features that assumed and those that are experimental. These limitations result in limited ability of existing approaches to use these various types of contextual features of the data to improve the accuracy of the model.

Transportation management systems provide support for the logistical issues in managing the transportation of persons, cargo or the like. In some transportation management systems, a driver provides transportation services to a rider to a location selected by the rider; the particular instance of driver transporting a rider is called a trip. The rider may provide a performance rating for the driver for the trip. For each driver, the aggregated performance rating (e.g., average performance rating) is typically used as a measure of the quality and/or skill of the driver in providing transportation services. One use of such performance rating is to identify better performing and more poorly performing drivers. Poorly performing drivers may be subject to additional interventions, including additional instruction and training to improve their overall performance, or deactivation from the platform. Conventional approaches to driver performance rating capture a single performance rating from the rider, such as a rating of one to five (e.g., one to five "stars"). Because such a rating reflects the rider's overall experience, it may, in fact, be based upon factors that are beyond the control of the driver—for example, a rider may provide a poor rating to the driver for a trip made during rush hour since the rider was delayed in reaching their destination, even though the rush hour traffic was beyond the control of the driver. Because there are numerous factors that can contribute to the rating given by the rider, conventional approaches that strictly look at a driver's average performance rating do not accurately assess the driver's actual contribution to the performance rating. As such, existing ensemble learning methods do not immediately lend themselves to applications for evaluating driver performance in transportation management systems.

SUMMARY OF INVENTION

Examples herein describe a system of predictive models, such as cascaded boosted predictive models, that provide an improved classification and predictive analysis over existing ensemble machine learning methods. According to some examples, a cascaded boosted predictive model uses sets of exogenous and endogenous variables that describe events or objects of interest for modeling purposes, and for which there is a dependent variable for the entity or event. As referred to herein, exogenous variables describe factors that are generally external to the entity or event that is being classified, and are outside of the influence or control of the observed entity or event. Endogenous variables describe factors that internal or a part of the entity or event, and thus under the influence or control of the entity or event. Depending on implementation, the cascaded predictive models can include one or more of an observed exogenous model, an observed endogenous model, an elicited endogenous model, and/or an experimental endogenous model. Each model outputs a predicted component portion of the dependent variable. For example, the observed exogenous model, which receives (as input) a set of exogenous variables (or a subset of them), is useful to predict a component portion that represents the portion that the overall environment contributes to the dependent variable, apart from any of the specific factors controlled by the particular entity or event. The predictive models are cascade boosted in that each model is trained on the residual of the previous model(s) with respect to the dependent variable. For example, a first residual between the output of a first model (e.g., the observed exogenous model) and the value of the dependent variable is then input into a second model (e.g., the observed endogenous model), which then models how the observed endogenous variables contribute to that residual value. A second residual between the output from the second model (e.g., the observed endogenous model), the first residual, and the dependent variable is obtained and input into a third model (e.g., the elicited endogenous model), which is based on values of variables that are specific to the entity or event, but which arises in response to specific conditions, event, actions, prompts, or the like. This third model generates a further predicted component portion, and a third residual is taken between this component portion, the second residual, and the dependent variable. Finally, this third residual is input in another model (e.g., an experimental endogenous model), which uses values of observed endogenous variables that define experimental or test conditions that are being evaluated for how they impact the dependent variable. The final output of model provides a final component portion of the dependent variable. Together the cascaded boosted predictive models identify how the various exogenous and endogenous variables contribute to the dependent variable, with greater explanatory power than provided by conventional ensemble machine learning approaches.

Unlike conventional gradient boosting methods, in which all of the models are trained on the same set of features (even accounting for random feature selection in random forest methods), in the present system, each model is trained on different category of features that are distinct from the specific features used in the other models, and thus the models selectively predict the distinctive contribution each category of features contributes to the performance rating, providing improved feature and model decorrelation with respect to conventional gradient boosted approaches. This leads to improved explanatory power of the models in terms of being able to identify the most significant variables in each category of features.

One specific application of the cascaded boosted predictive models is described in the context a transportation management system, which is configured to collect various sets of exogenous and endogenous variables that characterize trips with respect to contextual features regarding riders, drivers, and environmental attributes. In this embodiment, the events are trip and the exogenous variables are those that describe and account for the historical behavior of riders and drivers, as well as trip characteristics that pertain to the trip request up until the time the trip is deemed to start, and the endogenous variables are those that pertain to the rider, driver or the trip and that occur after the trip starts and up to the time the trip is completed. The transportation management system is configured to generate a plurality of cascaded boosted predictive models that can predict various components of a driver's rating based on differing sets of the exogenous and the endogenous variables that can account for various types of contributing factors. The predictive models may also be used to predict outcomes such as a likelihood of a complaint by a rider, the likelihood of a future use of the system by a rider within a selected time period, a request for a refund or other events indicative of a rider's satisfaction with the transportation management system. Here, the predictive models are cascade boosted in that each model is trained on the residual of the previous models with respect to the driver's performance rating. In one embodiment, the rating components predicted by the various predictive models may be scalar components of driver's rating. In another embodiment, the rating components may be probability values that indicate the probability of a given driver rating (e.g., satisfactory driver rating) based on the model variables.

In this particular embodiment, one of the predictive models is generated on a set of observed exogenous variables or pre-trip variables (in other words, the trip characteristics that would apply with respect to any driver who would be available to provide the transportation service to a rider making a particular trip request). This predictive model generates a first rating component, for example, that represents an expected portion ('expectation component") of a rating that an arbitrary driver in equivalent conditions would obtain from riders over time. Thus, when this expectation component is accounted for by removing it from a driver's average performance rating, the residual is the driver's rating over arbitrary replacement factor ("ROAR" factor): the specific contribution a driver makes to his average performance rating, as distinct from the rating that an arbitrary or hypothetical driver would obtain based on the variables that characterize each trip. While ROAR is described here in the context of a driver's rating, it can be applied in other contexts as well where one entity is rated or otherwise evaluated by another entity, and for which there are exogenous and endogenous variables that can be identified for application to the various predictive models.

Depending on implementation, the predictive models can generate one or more rating components, such as the first rating component, as described above, and/or other rating components. For example, a second rating component is a predicted portion of a performance rating from a second predictive model trained on observed endogenous variables associated with the trip, e.g., variables that arise between the time the trip has started and the time it is completed by the driver reaching the destination location. This rating component may be understood as a trip behavior component.

In another example, a third rating component is a predicted portion of a performance rating from a third predictive model trained on elicited endogenous variables associated with the trip, such as variables that arise in response to messages or other events prompted by the transportation management system to either the driver or the rider in the context of the particular trip. This rating component may be understood as a trip feedback component.

Still further, as an addition or an alternative, a fourth rating component is a predicted portion of a performance rating from a fourth predictive model trained on experimental endogenous variables associated with the trip, such as variables that arise in the context of experimental variations in the any component of the transportation management system, such as the variations in user interfaces of the applications used by the rider or driver, variations in routing decisions or algorithms, variations in messages provided to the driver or rider, and so forth also in the context of a particular trip. This rating component may be understood as an experimental component. As noted, each of the set of variables is distinct and represents different aspects of temporal, causal, environmental, or other contextual factors that can contribute to a driver's performance rating.

The transportation management system is configured to generate the set of predictive models for the corresponding rating components based on various sets of the exogenous and endogenous variables, and then determine each driver's ROAR factor from one or more of the predictive models. In other embodiments, in the ROAR factor may be computed as the average residual between the driver's performance rating and the sum of the rating components predicted by two or more of the predictive models.

The ROAR factor for a given driver can then be used in various examples. One use of the ROAR factor is to select the drivers who will receive a given trip request: drivers with high ROAR factors are more likely than the average driver in the current circumstances to obtain a maximal performance rating from the rider—which is beneficial to increase the likelihood of the rider having a positive experience, and thus the trip request is provided by the transportation management system to candidate drivers who have a ROAR factor above a threshold value or range. Another use of the ROAR factor is to selectively provide messages to the driver before, during or after a trip that instruct behavioral changes in the driver so as to increase the likelihood of the driver receiving a higher performance rating score. Another use of the ROAR factor is to identify drivers who are likely not meet performance rating goals in the future and provide them with additional training to improve their performance.

DETAILED DESCRIPTION

System Architecture

Figure 1:
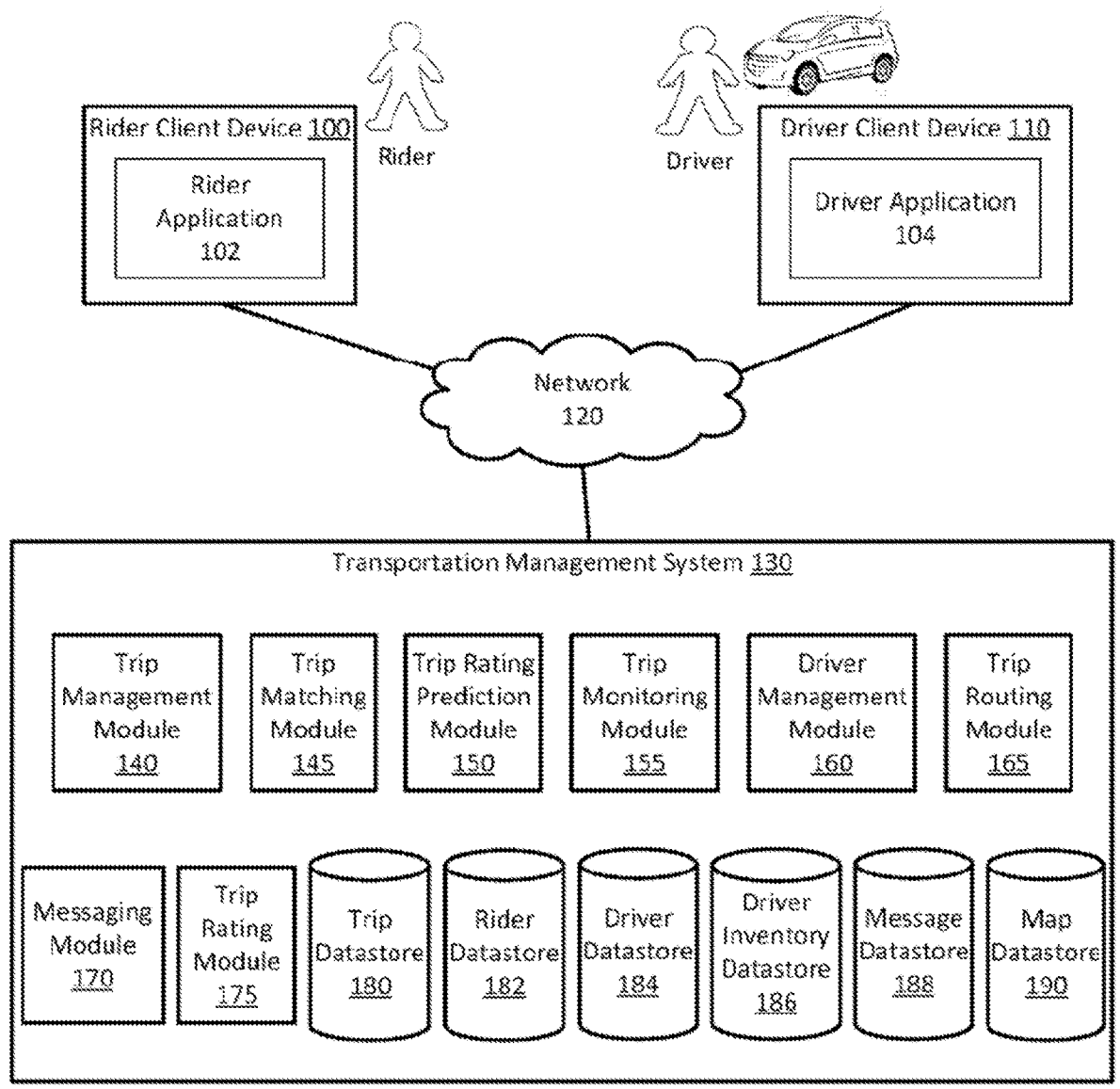
FIG. 1 illustrates the system environment for an example transportation management system.

Turning now to the specifics of a system architecture for one application of a cascaded boosted predictive model system, FIG. 1 illustrates the system environment for an example transportation management system 130. Transportation management system 130 coordinates the transportation of persons and/or good/item for a user ("rider") and a travel provider ("driver") using a vehicle to provide the transportation. In this example embodiment, the transportation management system 130 includes, a trip management module 140, a trip matching module 145, a trip rating prediction module 150, a trip routing module 155, a trip monitoring module 165, a driver management module 160, a messaging module 170, and various data stores including a trip data store 180, a rider data store 182, a driver data store 184, a driver inventory data store 186, and a message data store 188. These modules and data stores utilize memory resources of the system 130 to store executable instructional and data for performing the operations and algorithms described herein. The modules and data stores are not native components of a generic computer system, and provide structures and functions beyond the generic functions of a computer system, as further described below. In addition, the operations of the transportation management system 130 are sufficiently complex and require real-time data processing so as to preclude the performance therefore by mental steps in the human mind in any practical embodiment within the scope of the present invention.

Figure 12:
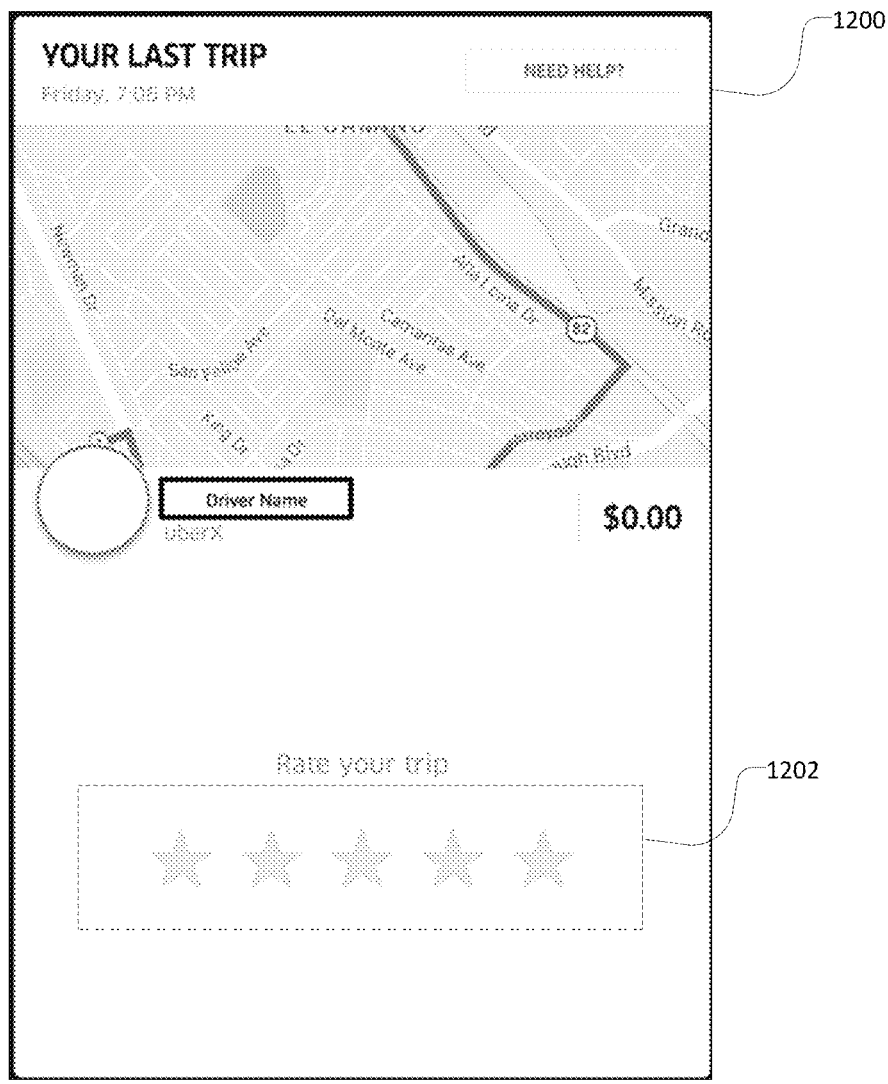
FIG. 12 illustrates an example user interface of a client application, as configured to receive a driver rating from a rider.

Each rider operates client device 100 that executes a rider client application 102 that communicates with transportation management system 130. The rider operates the client application 102 to make a request from transportation management system 130 for a delivery or transport service ("a trip") of the rider (and optionally additional persons) and/or items such as cargo needing transport. The rider client application 102 is configured to enable the rider to specify an origin location (e.g., from a specified location inputted by the user or corresponding to the current location of the client device 100 as determined automatically by a location determination module in the client device 100 such as GPS system) and/or a destination location for the trip. The rider client application 102 is configured to transmit a trip request to the transportation management system 130 over the network(s) 120. The trip request identifies the rider, along with certain exogenous variables for the desired trip. The transportation management system 130 uses the trip request to match the rider with available drivers, one of whom will be selected to pick up the rider and transport the rider to the desired destination. The rider client application 102 is further configured to enable a rider to provide a performance rating for a driver upon completion of a trip. In one embodiment, the rating is provided on a scale of one to five, five being the maximal (best) rating. FIG. 12 illustrates one embodiment of a user interface 1200 of the client application 102 configured to receive a rating 1202 of a driver from a rider.

The driver operates a provider device 110 executing a driver application 104 that communicates with the transportation management system 130 to provide information indicating whether the driver is available or unavailable to provide transportation services to riders, for example by logging into the transportation management system 130 and activating a setting that they are currently available to provide trips. The driver application 104 is configured to enable the driver to specify a current location (e.g., from a specified location inputted by the user) or determine a current location of the provider device 110 using a location determination module in the provider device 110 such as GPS system, wireless networking system, or a combination thereof. The driver application 104 is further configured to allow a driver to receive, from the trip matching module 145, an invitation(s) to provide a trip for a requesting rider, and to accept or reject the invitation. The driver application 104 is further configured to receive routing information from trip routing module 155, and messages from the messaging module 170. The driver application 104 is configured to enable a driver to provide a rating for of rider upon completion of a trip. In one embodiment, the rating is provided on a scale of one to five, five being the maximal (best) rating. In other examples, the ratings provided by riders and/or drivers can be on a different scale (e.g., one to ten, a percentage, etc.).

The client device 100 used by the riders and/or drivers are computing devices, such as portable electronic devices (e.g., smartphones, tablet devices, wearable computing devices (e.g., smartwatches) or similar devices), and/or other devices, such as an in-vehicle computing device. Client devices 100 typically have one or more processors, memory, touch screen displays, wireless networking system (e.g., IEEE 802.11), cellular telephony support (e.g. LTE/GSM/UMTS/CDMA/HSDPA, etc.), and location determination capabilities.

The trip data store 180 maintains a record of each in-progress and completed trip coordinated by the transportation management system 130. More specifically, each trip provided by a driver to a rider is characterized by a set of attributes (or variables), which together form a trip record that is stored in the trip data store 180. The attributes describe aspects of the driver, the rider, and trip. In one embodiment, each trip record includes a trip ID, a rider ID, a driver ID, the origin location, the destination location, the duration of trip, the service type for the trip, estimated time of pick up, actual time of pickup, and driver rating by rider, rider rating by driver, fare information, market information, and/or other environmental variables as described below. The variables for the trip record are thus drawn from multiple sources, including the rider's master and usage record in the rider data store 182, the driver's master and operational record in the driver data store 184, and specific variables captured and received during each trip.

The trip matching module 145 continuously processes the set of pending trip requests in the trip data store 180 by matching currently available drivers with one or more pending trip requests, and is one means for performing this function. In one embodiment, the matching is based in part on a prediction, generated by the trip rating prediction module 150, of a rating that a candidate driver would receive from the rider for that trip; in another embodiment, the matching is based on in part on a prediction, generated by the trip rating prediction module 150 of the probability that a candidate driver will receive a maximal rating from the rider requesting the trip. Additionally, the matching may be based in part on the current (or origin location) of the rider and the current location of the driver in their vehicle, as provided by the location determination components of their respective devices 100.

The trip rating prediction module 150 is configured to determine, for a given trip request made by a rider, the performance rating that the rider will give the driver, using one or more predictive models, and is one means for performing this function. The trip rating prediction module 150 is configured to receive from the trip matching module 145 a pending trip request and its associated observed, exogenous variables (as further explained below) for the requested trip, and apply these variables to a first predictive model generated from historical observed exogenous variables to generated a predicted rating of the driver by the rider for the trip.

The trip routing module 155 is configured to provide a recommended route from the rider's origin location to the destination for a trip, and transmit this route to the driver application 104 and is one means for performing this function. The trip routing module 155 is further configured to reroute a trip based on location information received from the driver application 104, indicating for example that the driver has deviated from the recommended route. The trip routing module 155 accesses map data from a map data store 190 as well as short-term data to predict travel speed along the route and select a route for the trip. The trip routing module 155 may use any suitable routing algorithm, such as Dijkstra's algorithm, for calculating the route between the origin and destination. The routing module 155 may also calculate the route from the location of the driver's vehicle to the origin location to assist the driver in picking up the rider. When the routing module 155 calculates the route, the routing module 155 may also calculate a distance or amount of time that the route will take. The routing module 155 may also access event and other short-term data from the map data store 190 to account for variations in routing that may occur due to this short-term data.

The rider data store 182 stores account and usage information for each rider who is a user of the system. For each rider, the rider data store 182 stores one or more database records associated with the rider, including both master data and usage data. Master data for a rider includes the rider's name, address information, cell phone number, payment information (e.g., credit card number), sign up date, rider acquisition type (e.g., referral, promotional code, employee), device type (e.g., type of cell phone), platform type (e.g., iOS, Android), application ID, and/or application version for the rider application 102. Usage data includes variables that characterize the rider's usage over the trips that the rider has taken using the system. For example, these variables include one or more of the following:

TABLE 1

| Rider Usage Variables | | |
|---|---|---|
| Variable Name | Description | Type |
| Number of trips | Total number of trips made by the rider. Further variations of this variable include such as the number of rides in the past 24 hours, past seven days, past month, etc. | Observed exogenous |
| Time Since Last Trip | Amount of time since the last trip by the rider. | Observed exogenous |
| Frequency of Cancelation by Rider | The percent of trip requests that the rider has canceled (e.g., number of cancelations/number of requests). | Observed exogenous |
| Frequency of Contact with Driver | The percent of times that the rider has contacted the driver (either by text or by calling) prior to being picked up by the driver e.g. number of contacts/number of trips. | Observed exogenous |
| Average Driver Rating | The average of the performance ratings given by the rider to the drivers. | Observed exogenous |
| Average Rider Rating | The average of the ratings given to the rider by the drivers of trips taken by the rider. | Observed exogenous |
| Frequency of Non-Max Rating of the Driver | The proportion of ratings given by the rider to drivers that are not maximal performance ratings; for example a rating of "5" in a 1-5 rating system. Thus, in this embodiment, it would be the number of times a rating of less than 5 was given by the rider to a driver divided by the total number of ratings by the rider. | Observed exogenous |
| Frequency of Non-Max Rating of the Rider | The proportion of ratings given by the drivers to the rider that are not maximal performance ratings. Thus, in this embodiment, it would be the number of times a rating of less than 5 was given by drivers to the rider divided by the total number of ratings made by drivers. | Observed exogenous |

TABLE 1-continued

Rider Usage Variables

| Variable Name | Description | Type |
|---|---|---|
| Number of Hours Since Last Non-Max Rating of a Driver | The number of hours that have passed since the last time the rider gave a non-maximal rating to a driver. | Observed exogenous |

The exogenous and endogenous variable types will be further explained below.

The driver data store 184 stores account and operational information for each driver who participates with the system. For each driver, the driver data store 184 stores one or more database records associated with the driver including both master data and usage data. Master data for a driver includes the driver's name, driver's license information, insurance information, vehicle information (year, make, model, vehicle ID, license plate), address information, cell phone number, payment information (e.g. credit card number), sign up date, driver service type (regular luxury pool van etc.), device type (e.g. type of cell phone), platform type (e.g. iOS, Android), application ID, and/or application version for the driver application 104. Operational includes variables that objectively characterize the driver's operation over the trips that the driver has provided using the system. These variables include one or more of the following:

TABLE 2

Driver Operational Variables

| Variable Name | Description | Type |
|---|---|---|
| Number of Trips by Driver | Total number of trips provided by the driver. | Observed exogenous |
| Number of Trips by Driver 4 Hour | Number of trips by made the driver in the past four hours. Other variations include number of trips in past 24 hours past week past month etc. | Observed exogenous |
| Time since shift start | Number of hours that the driver has been active in this shift. | Observed exogenous |
| Number of Hours Since Last Non-Maximal Rating of the Driver | The number of hours that have elapsed since the driver received a non-maximal (e.g. Non-Max) rating from a rider. | Observed exogenous |
| Frequency of Cancelation by Driver | The percent of trip requests that the driver has canceled (e.g., number of cancelations/number of requests accepted by the driver. | Observed exogenous |
| Average Driver Rating | The average of the performance ratings given to the driver by riders. This figure can be averaged over various intervals, such as averaged over the last one week, averaged over the last one month, averaged over the past ten trips, averaged over the past one hundred trips. Averages here are arithmetic means. | Observed exogenous |
| Average Rider Rating | The average of the ratings given by the driver to riders in trips provided by the | Observed exogenous |

TABLE 2-continued

Driver Operational Variables

| Variable Name | Description | Type |
|---|---|---|
| | driver. This figure can be averaged over various intervals as well, as with the average driver rating. | |
| Frequency of Non-Max Rating of the Driver | The proportion of ratings given to the driver by riders that are not maximal performance ratings. Thus, in this embodiment, it would be the number of times a rating of less than 5 was given to the driver to by a rider divided by the total number of ratings by the driver. | Observed exogenous |
| Frequency of Non-Max Rating of the Rider | The proportion of ratings given by the driver to the riders that are not maximal ratings. Thus, in this embodiment, it would be the number of times a rating of less than 5 was given by the driver divided by the total number of ratings made by the driver. | Observed exogenous |
| Number of Hours Since Last Non-Max Rating of a Rider | The number of hours that have passed since the last time the driver give a non-maximal rating to a rider. | Observed exogenous |
| Number of Complaints against Driver | Number of complaints made by riders with respect to the driver. | Observed exogenous |
| Driver ROAR | The current value of the driver's ROAR factor. | Output variable |

Additional variables may also be developed for either the rider or the driver such as the probability of the rider traveling during particular periods (e.g. percentage of rides during commuting hours evenings weekends high demand periods) the probability of a driver being available during such periods. Any of the foregoing variables may be weighted with respect to time so that more recent trips are weighted more heavily in any computation of the metric over older trips to provide a greater reflection of the rider's or driver's current behavior given that behavior and expectations can change over time. Also, foregoing variables that averages or percentages or other summary values may be calculated for different time periods, such as a number of days, weeks, months, or trips, and used in the model as well.

A trip record in the trip data store 180 may optionally include additional variables associated with the trip that relate to the characteristics of the specific trip the behavior of the driver or experimental variables. For example, the trip monitoring module 165 can provide for each trip record telematics information such as maximal acceleration amounts by the vehicle number of times the driver deviated from a designated route by missing a turn or an exit number of times the driver stopped, a number of times the driver exceed a posted speed limit and so forth. The trip record may also include variables indicating which messages the driver or rider received in connection with the trip as well as responses to questions presented to the rider or the driver.

In one embodiment, the trip data store 180 contains one or more of the following variables for each trip:

TABLE 3

Trip Record Variables

| Variable Name | Description | Type |
|---|---|---|
| Trip ID | Identifier of the specific trip | Not Applicable (N/A) |
| RiderID | Identifier of the rider | N/A |
| DriverID | Identifier of the driver | N/A |

TABLE 3-continued

Trip Record Variables

| Variable Name | Description | Type |
|---|---|---|
| Vehicle Type | Type of driver's vehicle | Observed exogenous |
| Vehicle Age | Age of driver's vehicle in years | Observed exogenous |
| City | City of service | Observed exogenous |
| Date/time | The date and time that the trip was requested. | Observed exogenous |
| RiderEmployee? | Whether the rider is an employee of the provider of the transportation management system 130. | Observed exogenous |
| Service type | The class of service provided by the driver such as standard, pool, luxury, van, and the like. | Observed exogenous |
| Estimated Time of Arrival and | The estimated time of arrival is an estimate of the amount of time (in seconds) that it should take for the driver to reach the rider's origin location given the current location of the driver at the time the driver selected the trip request for the rider. | Observed exogenous |
| Actual Time of Arrival | The Actual Time of Arrival is the actual amount of time it, in fact, took as determined from either an input received from the driver application that the driver has picked up the rider or a comparison of the location of driver's vehicle to the origin location. | Observed exogenous |
| ExtraETATime | The Extra ETA Time is a calculation of the extra time taken to reach the origin location relative to the estimate, e.g.: Extra ETA Time = (Actual Time of Arrival − Estimate Time of Arrival)/Estimated Time of Arrival. In this formulation larger positive values are indicative of increasing wait times for the rider; larger negative values are indicative of the driver arriving earlier than estimated. | Observed endogenous |
| Trip Distance | The actual distance of the completed trip. | Observed endogenous |
| Trip Duration | The actual amount of time for the completed trip as measured from the time of rider pickup to the time the driver indicates that the trip is completed | Observed endogenous |
| Trip Average Speed | Trip distance divided by trip duration | Observed endogenous |
| Surge Pricing | A multiplier (>1.0) applied during peak demand times | Observed exogenous |
| Fare | The amount charged for the trip. | Observed endogenous |
| Payment Credit | An indicator as to whether the fare was paid for with promotional or other types of credits. | Observed endogenous |
| Estimated Trip Duration | An estimate of the amount of time for the trip. | Observed endogenous |
| Extra Trip Time | The Extra Trip Time is a calculation of the extra time taken to reach the destination location relative to the estimated trip duration e.g.: Extra Trip Time = (Actual Trip Duration − Estimated Trip Duration)/Estimated Trip Duration. | Observed endogenous |
| Congestion Estimate | An estimate of the excess time associated with traveling the selected route for the trip due to traffic impact. This value may be computed as the ratio (timeActual/timeOptimal) − 1. | Observed exogenous |
| Number of Trip Reroutings | For the driver, the average number of times per trip that a supplied route for the trip had to be rerouted by the trip monitoring module as a result of the driving missing an expected turn or exit. | Observed endogenous |

TABLE 3-continued

Trip Record Variables

| Variable Name | Description | Type |
|---|---|---|
| Maximum Lateral Acceleration | Maximum readings of acceleration as measured by the driver's device 110. | Observed endogenous |
| Maximum Deceleration | Maximum reading of deceleration (braking) as measured by the driver's device 110. | Observed endogenous |
| Number of Hard Brakes | Number of deceleration events exceeding a given threshold (i.e. 11 KPH/s or approximately -0.3 g) as measured by driver's device 110. | Observed endogenous |
| Percentage Hard Brakes | Percentage of all deceleration events exceeding a given threshold (i.e. 11 KPH/s) as measured by driver's device 110. | Observed endogenous |
| Speeding Behavior | Driver's maximum speed in various road segments, based on observations from the driver's device 110, and normalized (e.g., percentile rank) to historically observed maximum speeds by other drivers on the same segments. | Observed endogenous |
| Distraction Behavior | Driver's distraction level during the trip, as measured based on observations from driver's device 110. For example, percentage of time windows (e.g., every 10 seconds) in which the driver was holding or interacting with the phone). | Observed endogenous |
| Waiting Time by Driver | Time between the driver's arrival at the origin location and the time the trip started as indicated by the driver. | Observed endogenous |
| DriverMessageList | List of message IDs or other identifiers of messages provided to the driver's client application 104 | Observed or Experimental endogenous |
| RiderMessageList | List of message IDs or other identifiers of messages provided to the rider client application 102 | Observed endogenous |
| DriverResponseList | List of responses (by ID or text values) received from the driver's client application 104 in response to question messages. | Elicited endogenous |
| RiderResponseList | List of responses (by ID or text values) received from the rider's client application 102 in response to question messages. | Elicited endogenous |
| Rider Rating | The rating of the rider by the driver. | Observed endogenous |
| Driver Performance Rating | The performance rating of the driver by the rider. | Dependent variable |

The above variables and attributes that characterize a trip can be partitioned into different categories, such as, for example:

Observed Exogenous Variables:

these are variables that are applicable to the trip but independent of the actual trip itself. They include variables that characterize the rider and driver's historical behavior as well indicate the location and time of the trip the market conditions in terms of demand seasonality factors and the type of vehicle and vehicle age (as obtained from the driver's master record). These variables are captured by the transportation management system 130 at the time the trip request is generated and may include variables that occur up to the time that the driver picks up the rider.

Observed Endogenous Variables:

these are variables that are specific to the particular trip including attributes of the nature of the trip itself, the driver and the rider. The rider and driver specific endogenous variable are extracted from the rider and driver records in their respective rider and driver data stores. The observed endogenous variables may be understood as those that occur during the trip and are at least partially under the control of the driver, while the observed exogenous variables are those that occur before the trip starts, and are outside the control of the driver.

Elicited Endogenous Variables:

these are variables that are specific to the trip but which are themselves elicited by transportation management system 130 from the driver and/or the rider, rather than being observed as inherent features of a trip. For example, these may include responses to question messages or instructions transmitted from transportation management system 130 to either rider application 102 or driver application 104.

Experimental Endogenous Variables:

these are set of variables that may be associated with a trip and relate to aspects of the trip which are being experimentally evaluated using transportation management system 130, rather than being fixed aspects of the system. For example, experimental endogenous variables may include identification of one or more messages that are displayed to the driver before or during the trip to determine if they impact the driver's performance rating, variations in the functionality or design of the rider or driver applications, variations in rider or driver workflows (e.g., sequence of steps for a rider to request a trip, or sequence of steps for a driver to select a trip request).

The designation of variables as exogenous or endogenous is a function of the relative point in time at which a trip is deemed to start. In one embodiment, a trip is deemed to start at the time the driver picks up the rider and/or signals the transportation management system 130 of this event, and endogenous variables are those that occur after this point in time up to the completion of the trip (e.g., when the rider leaves the vehicle and/or the driver signals the transportation management system 130 of this event). In another embodiment, a trip is deemed to start at the time the driver selects a trip request to fulfill, and thus, exogenous variables are those with values determined up to this point in time, and endogenous variables are those determined afterward.

Figure 2A:
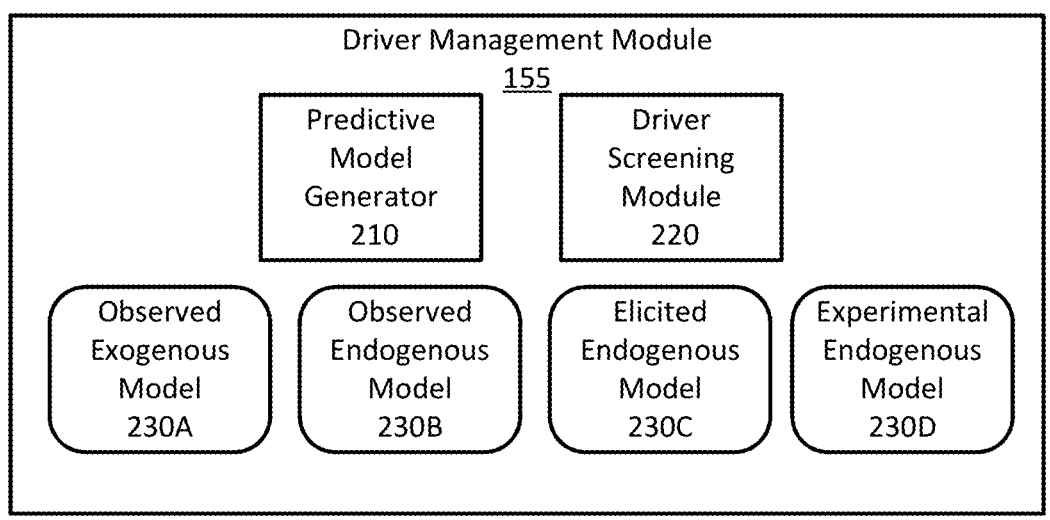
FIG. 2A illustrates an embodiment of the driver management module.

Referring again to FIG. 1 the driver management module 160 is configured to generate a set of cascaded boosted predictive models for predicting components of performance ratings of drivers based on historical trip records in the trip data store 180, which models are then used in the determination of a driver's ROAR factor, and is one means for performing this function. Referring to FIG. 2A there is shown an embodiment of the driver management module 160. In this embodiment, the driver management module 160 comprises a predictive model generator 210 a driver screening module 220 and a set of predictive models 230 (A-D). In one embodiment, the rating components predicted by the various predictive models may be scalar components of driver's rating. In another embodiment, the rating components may be probability values that indicate the probability of a given driver rating based on the model variables. For example, each of the models 230 can thus predict a different component of the probability that a rider will give the driver a satisfactory rating.

Figure 2B:
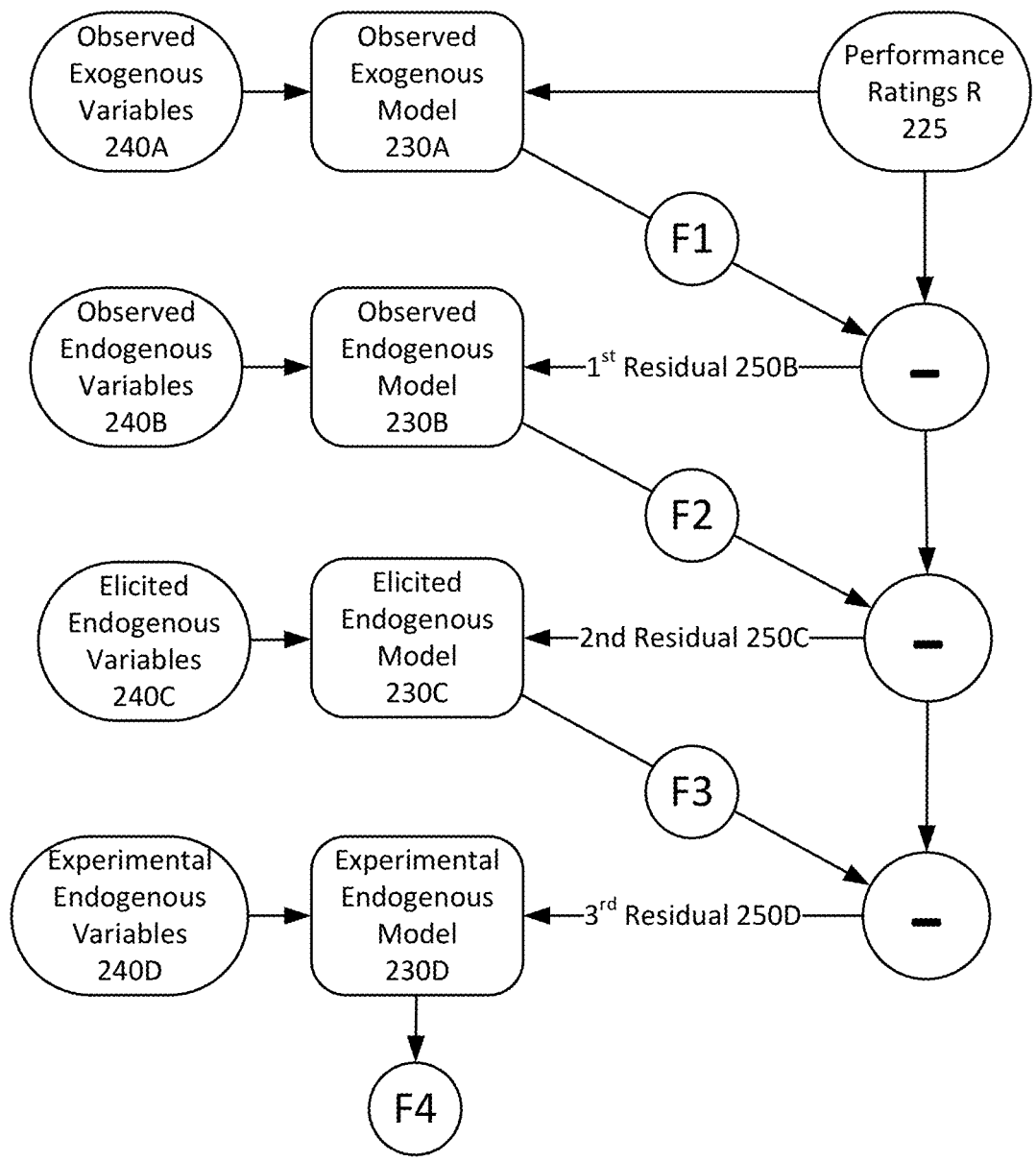
FIG. 2B illustrates the dataflow for generating the set of cascaded boosted predictive models, as performed by the predictive model generator.

Referring to FIG. 2B, a dataflow is illustrated for generating the set of cascaded boosted predictive models 230, as performed by the predictive model generator 210. The models are cascaded in that the outputs from one model are used to derive the inputs to a subsequent model; the models are boosted in that these specific inputs are the residuals from the prior model, so that each model learns to predict a portion of the error from a prior model, but in terms of a separable component of the overall performance rating and using its own distinct set of variables, rather than a common set of variables as in conventional boosting approaches.

Observed exogenous model 230A is a predictive model that is trained on selected observed exogenous variables 240A from trip records in trip data store 180 and the original performance ratings R (225) from those trips to predict a first component F1 of the driver performance ratings. This first component F1 reflects the contribution to a driver's performance rating that comes from the exogenous variables that are independent of driver's performance during the specific trip itself and yet nonetheless may contribute to the driver's overall performance rating for that specific trip. This model 230A thus accounts for how the overall conditions for the trip as well as the historical behavior of the driver and rider will impact the rider's experience and thus contribute to the driver's performance rating.

Observed endogenous model 230B is a predictive model that is trained on the observed endogenous variables 240B from trip records in trip data store 180 along with (R-F1) which is set of residuals 250B between the F1 component and the original performance ratings R to predict a second component F2 of a performance rating of a driver. The second component F2 reflects the contribution to a driver's performance rating (and hence to the residual component R-F1) that comes from the endogenous factors that are specific to the attributes of the trip itself such as the duration and distance of the trip. This model 230B thus accounts for how certain specific conditions for the trip impact the rider's experience and thus contribute to the driver's performance rating. The input of the residuals (R-F1) into model 230B form the first level of the cascade. Thus, predictive models 230A and 230B beneficially capture different contextual aspects of the overall trip, such as historical, environmental, temporal and agent (driver or rider influenced) specific features.

Elicited endogenous model 230C is a predictive model that is trained on the elicited endogenous variables 240C from trip records in trip data store 180 along with (R-F1-F2) which is the residual 250C of R the F1 component the F2 component to predict a third component F3 of a performance rating of a driver. This third component F3 reflects the contribution to a driver's performance rating that are related to either the rider's or driver's perceptions of the trip as reflected in responses provided by the rider or the driver to messages or questions provided during or after the trip by the transportation management system 130 via messaging module 170. The input of the residuals (R-F1-F2) into model 230C form the second level of the cascade. Predictive model 230C beneficially captures the contribution of intentionally elicited features as opposed to features that arise spontaneously from the nature of the underlying events, the trips themselves and the aspects of the transportation management system 130.

Experimental exogenous model 230D is a predictive model that is trained on the experimental exogenous variables 240D from trip records in trip data store 180 along with (R-F1-F2-F3) which is the residual 250D between R the F1 component F2 component and the F3 component to predict a fourth component F4 of a performance rating of a driver. This fourth component F4 reflects the contribution to a driver's performance rating that can be attributed to experimental variations in attributes captured during a trip. For example, the messaging module 170 may be configured to randomly provide a control message to one set of drivers and an experimental message to a different set of drivers to assess whether the experimental message had a measurable impact on the performance ratings relative to the control messages. The input of the residuals (R-F1-F2-F3) into model 230D form the third level of the cascade. Predictive model 230D beneficially captures the contribution of experimental features as opposed to native features in the transportation management system 130.

The predictive model generator 210 comprises program instructions configured to build and training each of the predictive models 230 from trip records in the trip data store 180. The specific details of how the various predictive models 230 are generated are further described below. As can be appreciated by those of skill in the art, over time a large number of trip records are accumulated in the trip data store 180. The predictive model generator 210 uses these trip records to generate predictive models of driver performance.

Figure 4A:
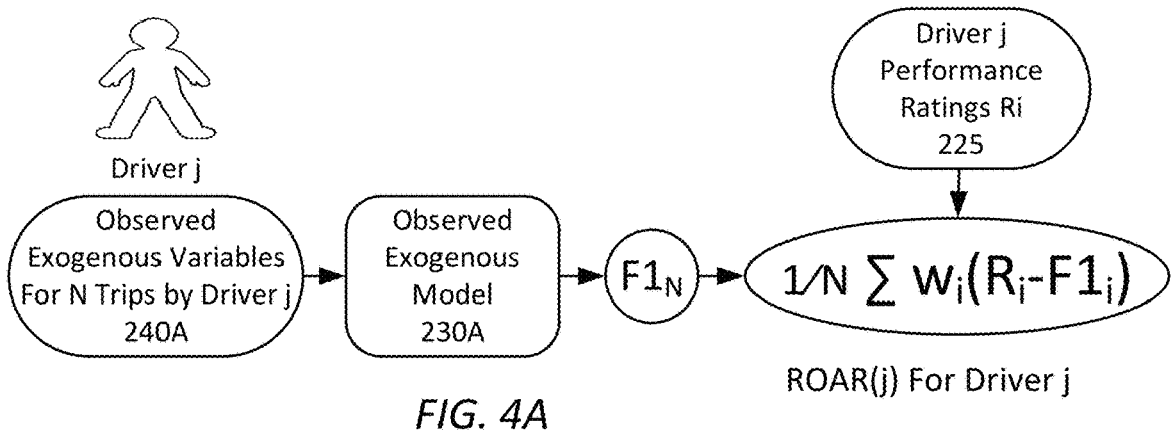
FIGS. 4A, 4B, and 4C illustrate different ways of calculating a driver's ROAR factor using combinations of first, second, and fourth predictive models.

The driver management module 160 comprises program instructions configured to determine a driver's ROAR factor using one or more of the predictive models 230 and to utilize the ROAR factor to rank and evaluate drivers. Referring to FIG. 4A, in one embodiment, the driver management module 160 calculates a driver's ROAR factor using the first predictive model 230A:

$$\text{ROAR}(j) = \frac{1}{N_j} \sum_{i=1}^{N_j} w_i (R_i - F1_i)$$

where
ROAR(j) is the ROAR score for driver j,
$N_j$ is the number of rated trips for driver j,
$R_i$ is the rating given to the driver by the rider in $i^{th}$ trip,
$w_i$ is a weighting factor,
$F1_i$ is the component output by the observed exogenous model 230A using the observed exogenous variables 240A specific to the $i^{th}$ trip.

In other words, a driver's ROAR score is the average difference between the performance rating $R_i$ that the driver received for the $i^{th}$ rated trip and the predicted performance rating component $F1_i$ based on the observed exogenous variables for that trip. Since not all trips by a driver are rated by the rider, the driver screening module 220 selects only trips that have ratings for the driver when computing a driver's ROAR factor.

The rating R can be expressed as entered by the rider, for example scaled rating (e.g., 1-5) or a positive/negative rating (e.g., "thumbs up"/"thumbs down."). The rating as input by the rider may also be mapped to a different scale prior input to the model, for example to emphasize particular rating values or ranges, such as satisfactory versus unsatisfactory ratings. For example, in an embodiment using the input ratings on a 1-5 scale, a threshold for rider satisfaction may be set at 4, so that an input rating than 4.00 is deemed unsatisfactory and an input rating equal to or greater than 4.00 is deemed satisfactory. Other thresholds may be used as well. Unsatisfactory ratings are encoded as R=0 and satisfactory ratings are encoded as R=1 prior to mode input. Continuing the prior example, the input ratings are mapped where R=0 where input rating is 1 to 3.99, and R=1 where input rating is equal to or greater than 4.00. In these embodiments, the predicted rating component may be beneficially interpreted as the estimated probability (or component thereof) of a satisfactory rating by the rider.

The weighting factor $w_i$ is can be set to control the contribution of different trips; if $w_i=1$, then all trips are weighted equally. Weight w can be set as a decay factor to down weight older trips, for example using a linear (or non-linear, e.g., exponential) decay computed from the number of days since the $i^{th}$ trip was made. Weight w can also be set according to the value of other variables, such the number of trips by the rider or the driver, categorical variables such as the service type or whether the rider is an employee or the like.

It is helpful to note here that the predicted rating component F1 used when determining ROAR are postdiction values in the sense that the trips for which the F1 component is being predicted have in fact already occurred. By using the predictive model 230A, the transportation management system 130 is able to postdict or estimate the rating that an arbitrary driver j (or colloquially, the "average driver") would have received in each of trips that driver j provided. The difference between driver j's actual performance rate R for each such trip and the postdicted F1 component is a measure of how driver j's marginal impact on the trip rating. Taking the average of these differences over the set of trips by driver j gives a measure of driver j's average impact on his or her performance ratings. A driver with a high ROAR does consistently better than predicted; a driver with a low ROAR does consistently worse than predicted, and thus may be a candidate for remediation or other actions.

Figure 4B:
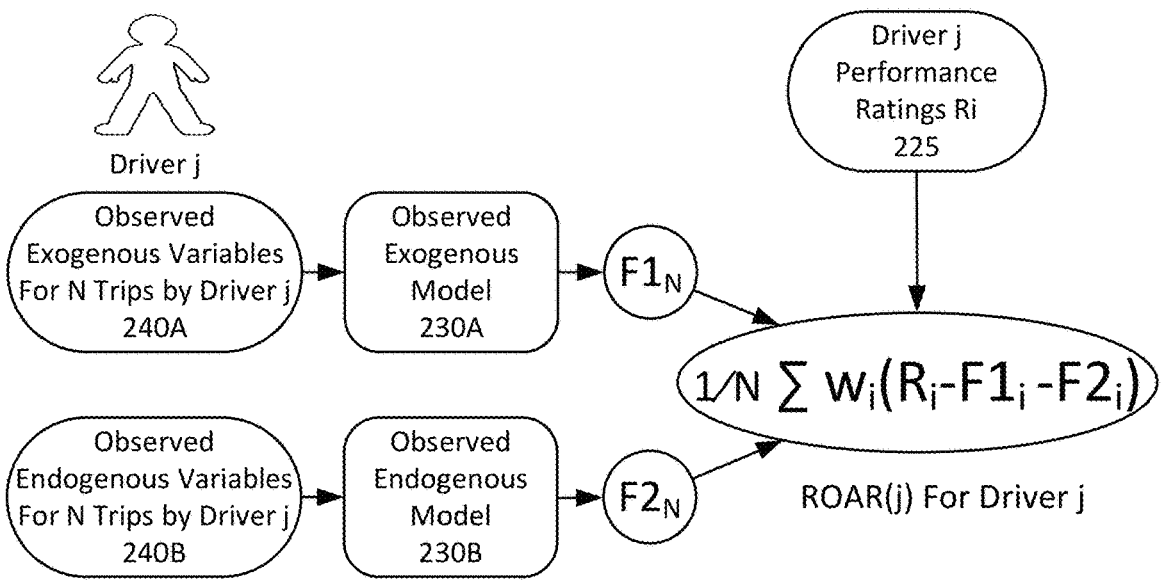

The ROAR factor may be based as well on the rating components F2, F3, and F4 from the other predictive models 230B, 230C and 230D. Referring to FIG. 4B, for example, it may be beneficial to account the observed endogenous variables 240B that arise during a trip, such as the actual distance of the trip, number of times the trip was rerouted, time spent waiting by the driver, telematics received during the trip (e.g., maximum acceleration or deceleration), and so forth. In this embodiment, ROAR is determined as:

$$\text{ROAR}(j) = \frac{1}{N_j} \sum_{i=1}^{N_j} (R_i - F1_i - F2_i)$$

In this embodiment, the driver's ROAR factor identifies the driver's contribution to her average performance rating as compared to all other drivers in similar circumstances relative to the endogenous variables.

Figure 4C:
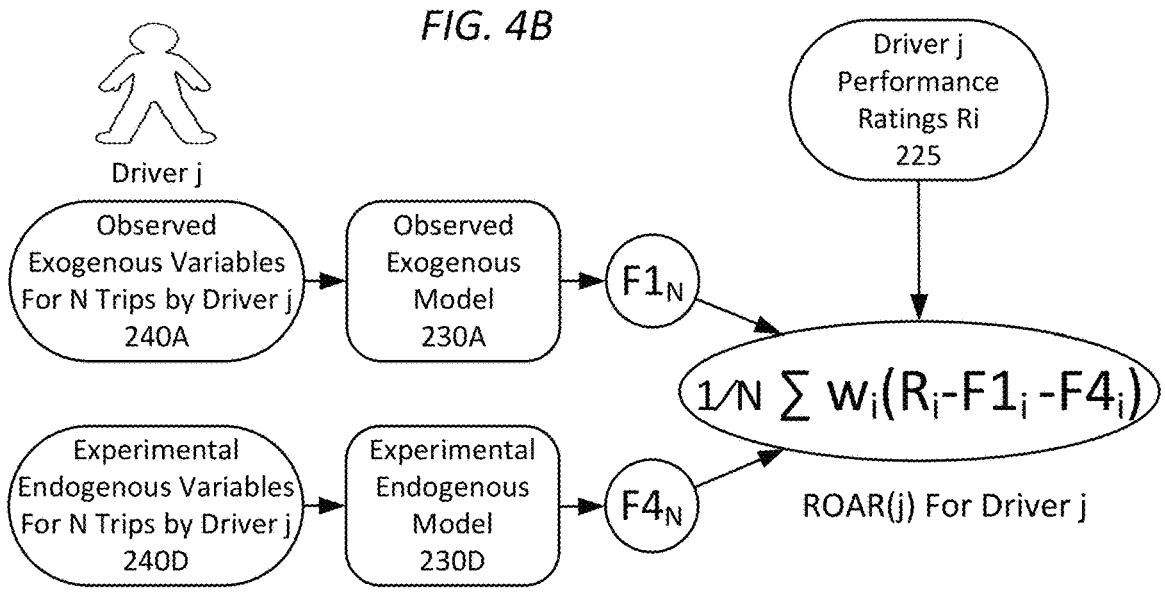

Referring to FIG. 4C, to observe the impact of experimental factors on a driver's ROAR factor, ROAR can be based on the F4 component provided by fourth predictive model 230D:

$$\text{ROAR}(j) = \frac{1}{N_j} \sum_{i=1}^{N_j} (R_i - F1_i - F4_i)$$

In this embodiment, the trips for driver j are selected to sample match all other drivers who were under the same set of experimental endogenous variables as driver j. For example, if the experimental variables were in the form of different sets of messages (say messages sets A, B, and C) provided to the drivers, then the trips k would be limited to those in which driver j received a message from one of these sets.

From the foregoing it can be appreciated that a driver may have multiple different ROAR factors, based on the driver's actual performance ratings over a set of trips and different combinations of the predicted rating components F1, F2, F3, and F4 for such trips The driver management module 160 updates a driver's ROAR factor each time the driver completes a trip and there is a performance rating provided by the rider. For example the DMS can update a driver's ROAR using an incremental average where the updated ROAR factor for the $i+1^{th}$ trip is $$\text{ROAR}(i+1) = \text{ROAR}(i) + \frac{R_{i+1} - F1_{i+1} - \text{ROAR}(i)}{i+1}$$

The driver management module 160 is further configured to use the ROAR factors for the drivers to identify drivers that are in need of performance training or messaging as further explained below.

Effectiveness of ROAR in Driver Performance Evaluation

Figure 5A:
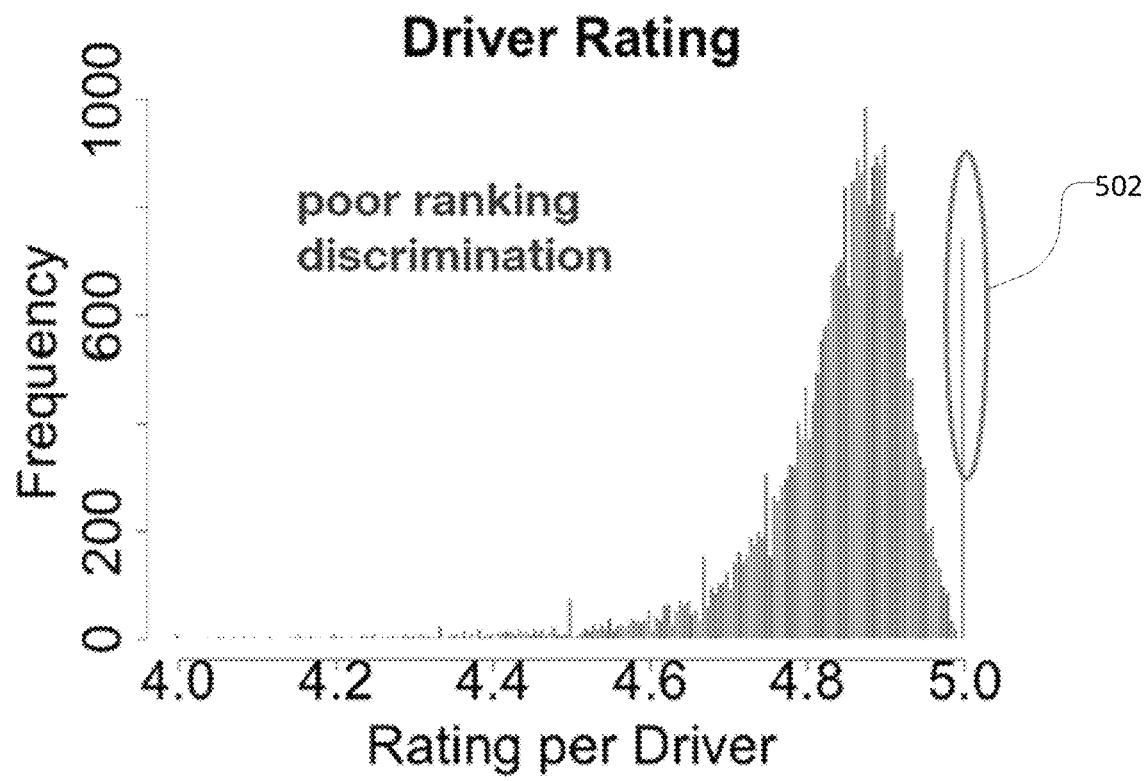
FIG. 5A illustrates a histogram of average performance ratings over a large population of drivers.

In the context of a transportation management system, the ROAR factor is far better in distinguishing between the performances of drivers than conventional use of average performance ratings. Referring to FIG. 5A, there is a shown a histogram of average performance ratings over a large population of drivers. The x-axis represents average performance rating on a 1-5 scale, and each vertical line represents the number of drivers with that average performance rating. As can be seen at marker 502, for this selected population of drivers, a large number of drivers receive the maximal rating of 5, and the rest of the population is narrowly distributed around 4.82, with very few drivers below 4.6, with an uneven distribution indicated by a very long lower tail, and very short upper tail. The narrow band of ratings, the uneven distribution pattern, and the larger cluster at the maximal rating demonstrates that average ratings do not accurately distinguish between drivers.

Figure 5B:
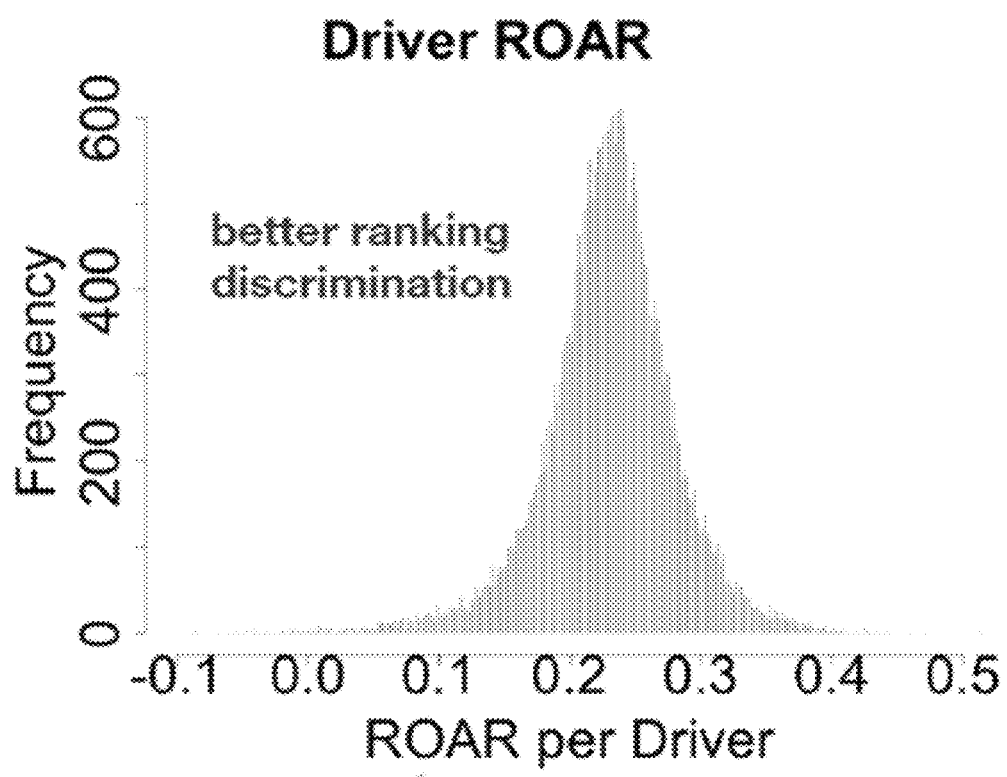
FIG. 5B illustrates the same driver population, but now represented with respect to their ROAR factors.

Referring to FIG. 5B, there is the same driver population, but now represented with respect to their ROAR factors. Here, it can be seen the ROAR has a relatively normal distribution, with approximately equal upper and lower tails. This indicates that ROAR better reflects the normal variances in behavior that real world populations exhibit.

Figure 6:
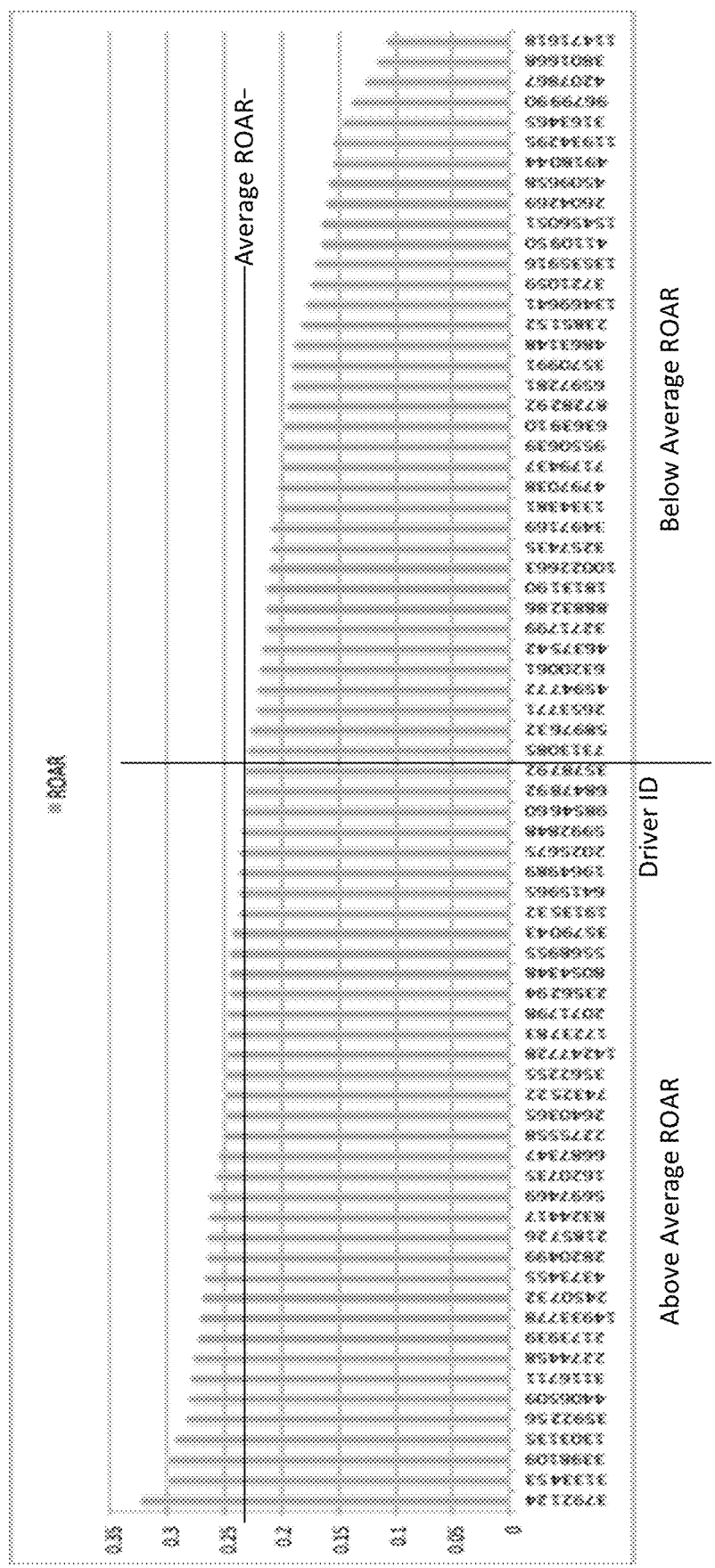
FIG. 6 illustrates a distribution of ROAR for a set of drivers all having the same average performance rating of 4.8 (on a 1-5 scale).

Referring to FIG. 6, there is a further illustration of how ROAR distinguishes between drivers in a manner that conventional ratings do not. This figure illustrates the distribution of ROAR for a set of drivers all having the same average performance rating of 4.8 (on a 1-5 scale); the labels are the x-axis are driver identifiers. Thus, all drivers here have the same performance rating. However, they do not have the same ROAR factor. As shown here, the ROAR factors are smoothly distributed from a high of about 0.34 to a low of about 0.11. Thus, even though these drivers all appear to have a high average performance rating, about half of them have a ROAR above 0.23, average ROAR in the population shown in FIG. 5B and half are below that value. Those below the average ROAR thus underperform relative to their peers, while those above the average ROAR outperform their peers.

Figure 7:
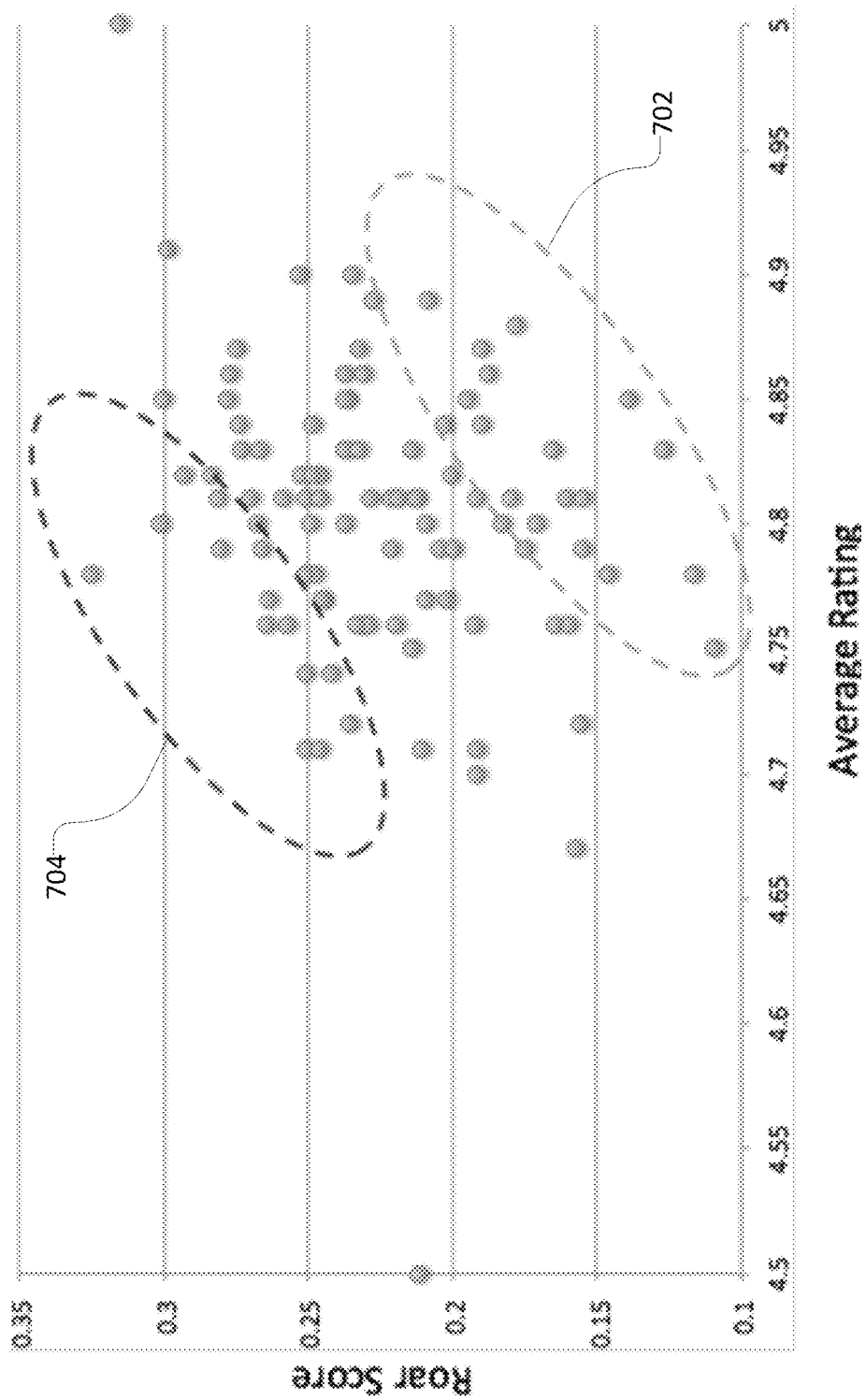
FIG. 7 illustrates a scatterplot of driver ROAR versus driver average rating.

Referring to FIG. 7, there is shown a scatterplot of driver ROAR versus driver average rating. The lower cluster 702 is a set of drivers with high average ratings (between approximately 4.75 and 4.88) and lower ROAR factors (between 0.11 and 0.22). While having high average ratings, these drivers actually underperform relative to their peers, that is drivers in similar trips (as defined by observed exogenous variables). By contrast, the drivers in the upper cluster 704 have what appear to be lower performance ratings, but higher ROAR factors (0.23 to 0.33). These drivers actually outperform their peers in similar circumstances; the lower average ratings for these drivers tends to reflect that they driver under generally more difficult circumstances that tend to lower all driver ratings, such as periods of congestion.

As can be seen here then ROAR allows for identification of comparatively less well performing drivers who would appear, just using conventional average ratings alone, to be above average in performance.

System Operation: Pre-Trip Rating Prediction

Figure 3A:
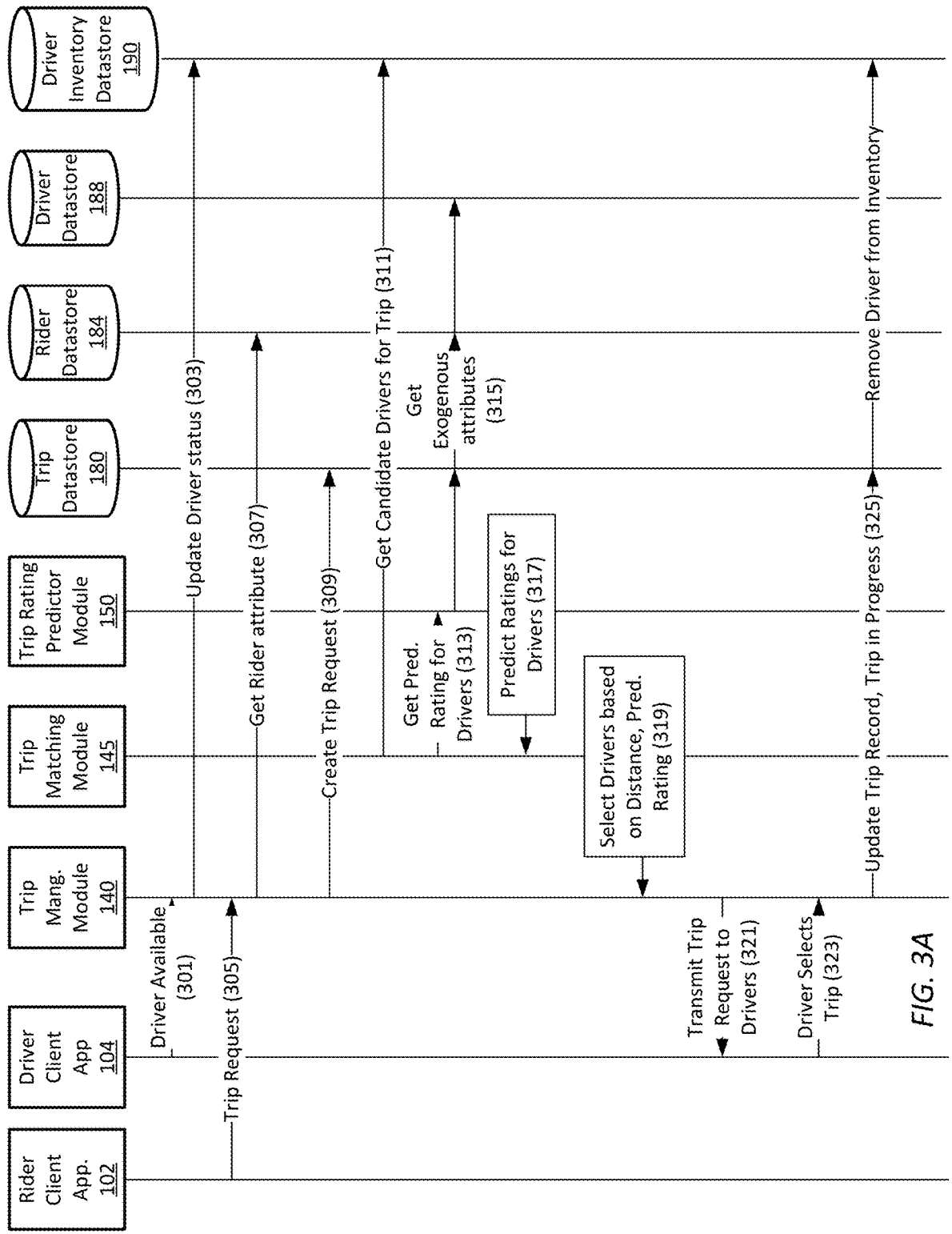
FIGS. 3A and 3B illustrate an interaction diagram for an algorithm for using pre-trip rating predictions from one or more of the predictive models in the matching of candidate drivers for a given trip request.
Figure 3B:
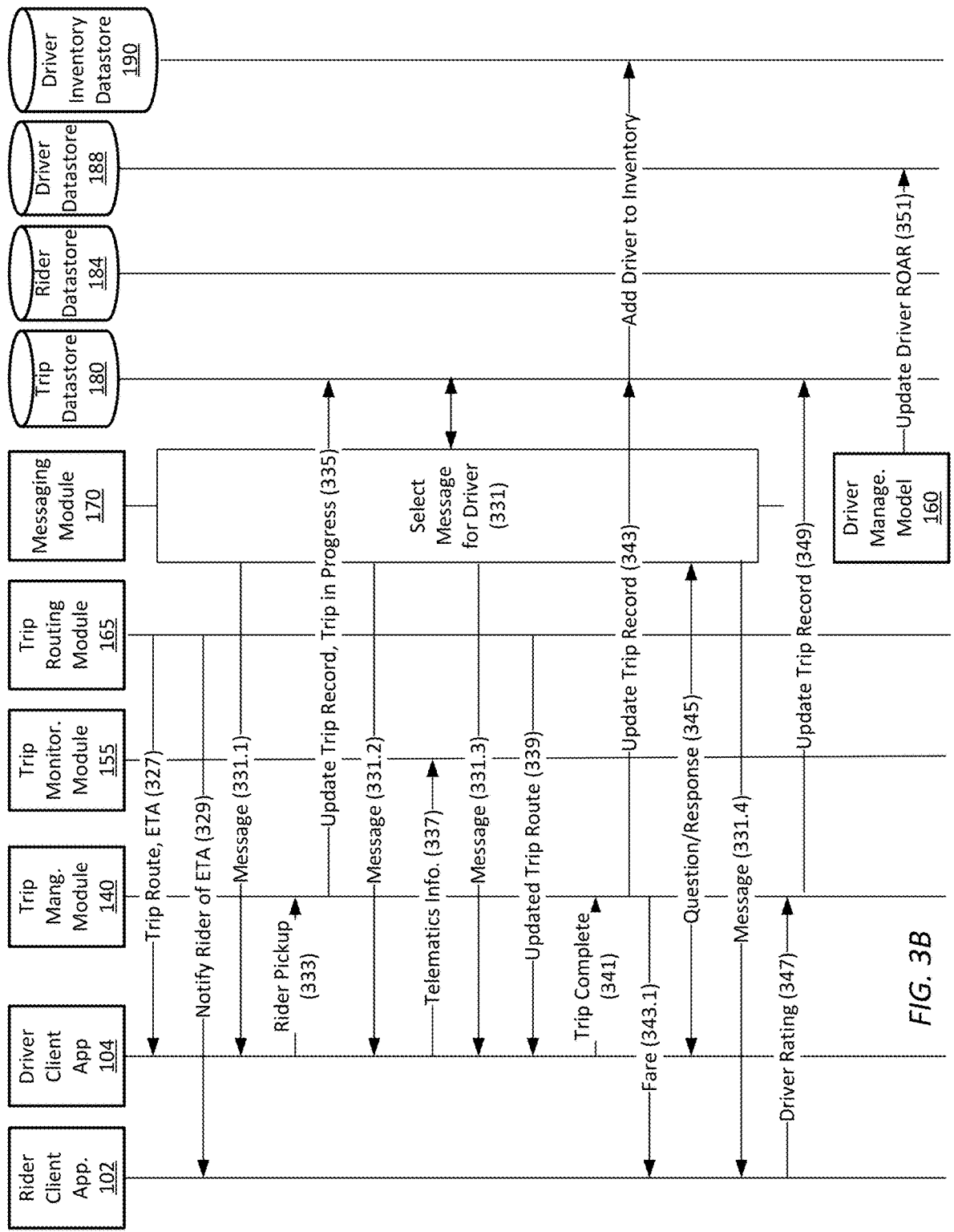

Referring now to FIGS. 3A and 3B there is shown an interaction diagram for an algorithm for using pre-trip rating predictions from one or more of the predictive models 230 in the matching of candidate drivers for a given trip request.

301: The driver uses the driver application 104 to transmit a message the trip management module 140 indicating that the driver is available for transporting riders.

303: The trip management module 140 updates the status of the driver in the driver inventory data store 186 with a record indicating the driver is available for matching, and location of the driver (which gets updated periodically). This step occurs repeatedly over the pool of drivers.

305: Separately the trip management module 140 receives a trip request from a rider, which request includes the rider's current location (typically the origin location) and intended destination.

307: The trip management module 140 obtains the rider's attributes from the rider's master record in the rider data store 182.

309: The trip management module 140 creates a pending trip record in the trip data store 180 indicating that the rider is available for pickup.

311: The trip matching module 145 continuously monitors the available trip requests in the trip data store 180 and determines from the driver inventory data store 186 which drivers are potential candidates to pick up the rider for each trip request k, to create a list $J_k$ of candidate drivers for that trip request. For a set of currently available drivers in the city of the trip request, the trip matching module 145 can determine from the pending trip requests in the trip data store 180 those for which the origin location is within a configurable maximum distance of the driver's current location or within a maximum estimated travel time. For example, the trip matching module 145 can identify pending trip requests within 10 minutes estimated travel time; this can be done for example by calling the trip routing module 155 with the current location of the driver as a starting point and the origin location of the rider as the ending point and obtaining a route and estimated travel time.

313: The trip matching module 145 calls the trip rating prediction module 150 providing a reference to the trip record containing the observed exogenous variables $T_k$ for the trip k and the list $J_k$ of candidate drivers, to obtain a predicted rating $R_k$ for each candidate driver for trip k.

315: For each candidate driver j in J, the trip rating prediction module 150 obtains the appropriate exogenous variables $Ex_j$ from the driver j's record in the driver data store 188 as well as any exogenous variables $Ex_i$ for the rider i from the rider data store 184.

317: The trip rating prediction module 150 then applies the obtained variables to the observed exogenous predictive model 230A to obtain a predicted rating:

$$R_{k,j}=F(T_k, Ex_k, Ex_i)$$

where F( ) represents predictive model 230A. The trip rating prediction module 150 updates the list $J_k$ of candidate drivers to include the predicted rating $R_{k,j}$ for each driver j, which the trip rating prediction module 150 then ranks from highest predicted rating to lowest. The trip rating prediction module 150 returns the list of ranked candidate drivers to the trip matching module 145.

For example, assume that there are ten drivers within the prescribed distance or estimated ETA for a given rider request:

| DriverID | ETA (minutes) | Predicted Probability of rider satisfaction |
|---|---|---|
| 803 | 8 | 0.89 |
| 817 | 5 | 0.85 |
| 149 | 4 | 0.84 |
| 468 | 8 | 0.83 |
| 779 | 7 | 0.81 |
| 761 | 9 | 0.81 |
| 431 | 8 | 0.80 |
| 377 | 2 | 0.75 |
| 136 | 4 | 0.73 |
| 308 | 5 | 0.70 |

Here driver 803 is the highest ranked based on her predicted rating given the observed exogenous variables for the trip.

319: The trip matching module 145 then selects one or more drivers to whom to present the trip request based on their predicted trip rating and ETA. For example, the trip matching module 145 can select only those candidate drivers having a predicted trip rating above a threshold level. Alternatively, since the number of candidate drivers can vary considerably with respect to any particular trip request the trip matching module 145 may select some number or percentage of the top-ranked candidate drivers (e.g. top 10%). The percentage can be a function of the number of candidate drivers so that as the number of candidate drivers increases the smaller the top percentage for selection becomes so that only the top-ranked drivers are given notice of the pending trip request. Continuing the above example, the trip matching module 145 may select only those drivers in the above list with a predicted satisfaction probability than 0.83 and exclude driverID 337 even though driverID 337 has the shortest estimated ETA of two minutes.

321: The trip matching module 145 then transmits to the driver application 104 of each selected driver the origin location of those trip requests that have been matched to the driver.

323: Each driver can use his or her respective client device and driver application 104 to select from the presented trips which specific trip request to fulfill, transmitting this information back to trip management module 140.

325: The trip management module 140 updates the trip record to indicate that pending trip request has been fulfilled and that the trip is now in progress, and removes the driver from the pool of available drivers in the driver inventory store 186 so that the trip matching module 145 no longer attempts to match the trip request with available drivers, and no longer includes the driver as a candidate for other pending requests.

327: When a driver has selected a rider to pick up trip management module 140 calls the trip routing module 155 to determine a current route for the driver to take to the origin location and estimated travel time (estimated ETA) and transmits this routing information and ETA to the driver's client application 104.

329: The trip routing module also transmits the estimated ETA to the rider client application 102; this information is also added to a trip record in the trip data store 180.

331: The messaging module 170 optionally selects and transmits one or more messages (331.1) to the driver's client application 104 from the message data store 188. The message provides specific guidance to driver to take one or more actions that can improve the driver's probability of receiving a higher or maximal performance rating. The messages in the message data store 188 may be keyed to one or more of the exogenous variables for the specific trip so that the message can be selected conditioned upon the value of the associated exogenous variable. For instance, the messaging module can determine from the current trip records whether surge pricing is in effect in which case module 170 retrieves a corresponding message from the message database to transmit to the driver such as a message the acknowledging the current surge pricing (e.g. "Thank you for riding with me during this surge period."). Similarly, if the trip record indicates that a congestion estimate is over a specified value and thus likely to increase the time of the trip the messaging module 170 retrieves a corresponding message from its message database such as "There's a lot of traffic heading towards your destination."

The messaging module 170 may also select messages from the message data store 188 based on the driver's current ROAR factor and/or predicted rating for the trip as provided by the trip rating prediction module 150, where again the message is structured to increase the likelihood of a higher or maximal performance rating from the rider. For example, where the driver's ROAR factor is lower than expected for the total number of trips provided by the driver compared to other drivers a message may be selected to instruct the driver to act politely, offer the rider a bottle of water, drive more cautiously, and so forth.

Any messages selected based on exogenous variables or driver ROAR can be selected randomly as part of an experimental testing protocol to evaluate the extent to which particular messages impact the performance ratings. For example, three different messages related to surge pricing may be designed: a control message C and two experimental alternative messages A and B. The messages would be selected randomly during surge periods and transmitted to the drivers via their respective driver applications 104. The different message IDs (A, B, C) would then be recorded in the DriverMessageList as experimental endogenous variables 240D, and used in training an instance of experimental endogenous model 230D.

The messaging module 170 may provide messages (331.2) at various different times during the trip to the driver. The messaging module 170 may also provide messages (331.4) to the rider client application 102, for example with updates on current traffic conditions. Messages transmitted to the rider are listed in RiderMessageList.

333: The driver travels to the origin location of the requesting rider and picks up the rider; at the time the driver picks up a rider, the driver uses driver application 104 to signal trip management module 140 that the rider has been successfully picked up.

335: The trip management module 140 adds the actual time of arrival to the trip record in the trip data store, and updates the value of the ExtraETAtime. The trip management module 140 calls the trip routing module 155 to calculate an estimated ETA for the destination and this information is added to the trip record as well. The driver then transports the rider to the designated destination location.

337: During the trip itself the trip monitoring module 165 optionally receives information from the driver's client application 104 indicating the location of the driver's vehicle and telematics information (e.g. such indications of current speed acceleration/deceleration events stops and so forth). This information may be used to as part of observed endogenous variables 240B for training the observed endogenous model 230B. The information may also be used by messaging module 170 to provide updated messages to the driver. For example, if the telematics information 337 indicates the driver is speeding, a message (331.3) from the messaging module 170 may instruct the driver to slow down. Again, messages may be selected based on any available variables in the trip record, as well as experimental conditions. Transmitted messages are indicated in the DriverMessageList in the trip record.

339: The trip routing module 155 also receives location information for the driver's vehicle and provides update routing information for a route for the driver to take to the destination rerouting as needed where the driver deviates from a specified route. Deviations from provided routes are logged for the trip record.

341: When the driver reaches the destination location the driver uses driver application 104 to signal transportation management system 130 that the trip is completed and to provide a rating of the rider by the driver.

343: Transportation management system 130 calculates fees to be paid by the rider for the trip and communicates this information (343.1) to rider application 102 and may also process payments for the rider. The transportation management system 130 marks the trip record as complete at this point and adds the driver back into the inventory of available drivers in data store 186.

345: The messaging module 170 optionally transmits one or more questions to the driver and receives corresponding responses. In one embodiment, the questions assess the current cognitive or emotional attributes of the driver. For example, cognitive questions may present tests of memory, logic, reaction time, hand-eye coordination skills. Emotional attributes can be determined by questions regarding mood, disposition, or the like. Identifiers for the questions would be stored in the DriverMessageList, and the responses to such questions would be stored in the DriverResponseList. The responses are elicited endogenous variables and would be used to train elicited endogenous model 230C.

347: Rider application 102 provides the user interface by which the rider can provide a performance rating of the driver for the particular trip. The driver's rating is transmitted to the trip management module 140.

339: The trip management module 140 updates the trip record with the performance rating of the driver.

351: The driver management module 160 computes the driver's updated ROAR factor(s) based on the performance rating for the completed trip. The driver management module 160 further updates the driver's operational record in the driver data store 184 based on the trip record, as shown the variable list in Table 2, above.

Applications of ROAR: Driving Screening

Figure 8:
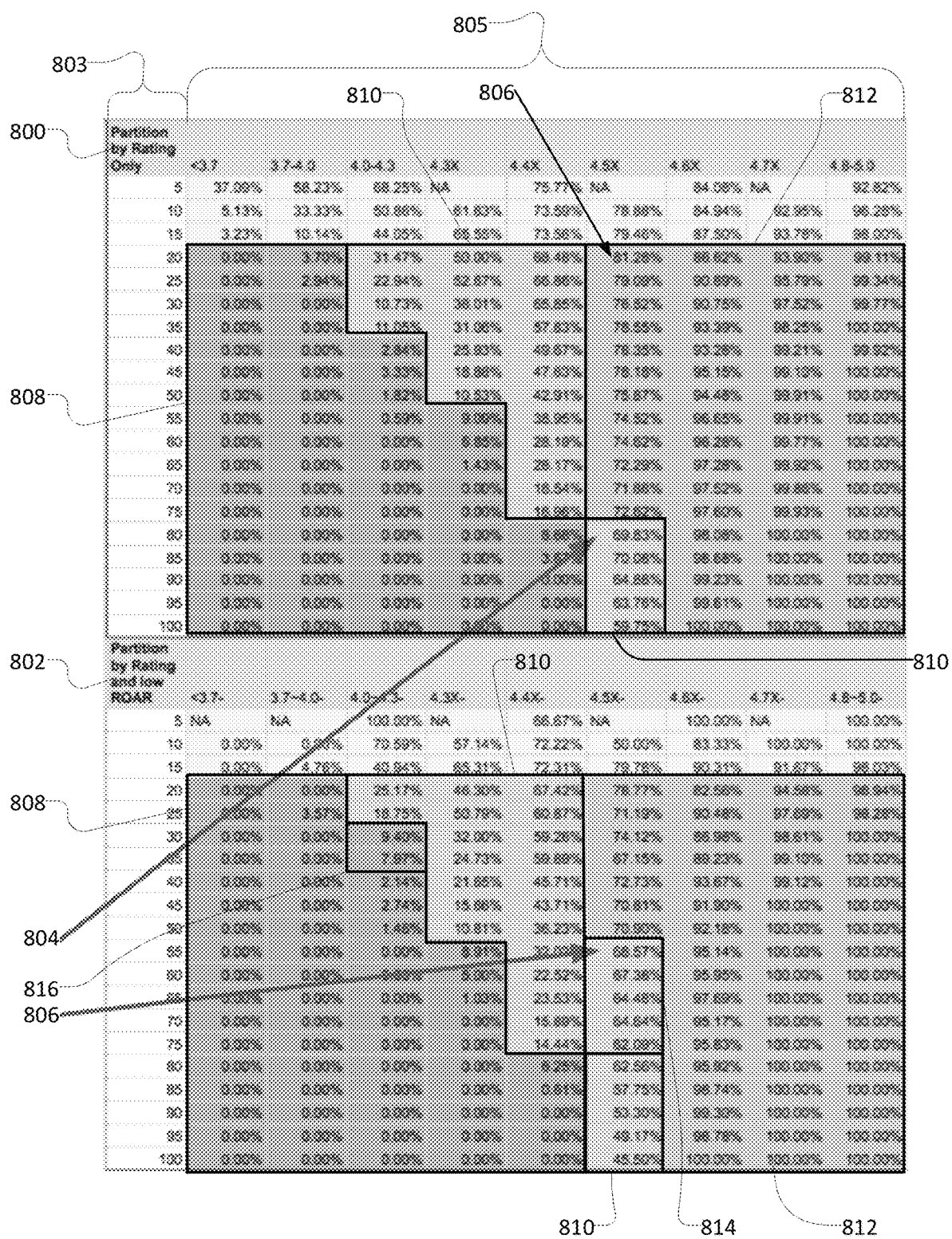
FIG. 8 illustrates sample driver screening tables.

One of the applications of ROAR is in driver screening, as provided by the driver screening module 220. The driver screening module 220 is configured to automatically identify drivers who are performing below, or likely to perform below, performance targets based on their ROAR factors. Referring to FIG. 8, there are shown two examples of ratings tables 800, 802 used for driver screening. In each table the columns (<3.7, 3.7-4.0 . . . 4.8-5.0) are bins 805 for average performance ratings. Each row corresponds to a number of trips made by drivers, as indicated by the trip number counts in the trip count column 803. Each cell stores the probability that a driver with the completed the number of trips indicated by the row and a performance rating in the bin for the rating column 805, will obtain a target satisfactory performance rating after 100 trips, e.g., an average performance rating of 4.6.

The upper table 800 shows average ratings alone without regard to the driver's ROAR score, while the lower table 802 shows the same ratings bin in table 800, but restricted to the drivers with lower ROAR scores within their bin, for example, drivers with ROAR factors less than 0.2×. The two tables are shown here to further illustrate how ROAR aids in identifying drivers in need of training or other actions. In tables 800 and 802, the row bins (by 5 trips) and column bins are illustrative; smaller or larger bins may be used as desired.

In table 800, as indicated in cell 804, a driver who has completed 80 trips and has an average performance rating between 4.50 and 4.59 has a 69.83% probability of reaching the target performance rating of 4.6. By contrast, a driver who has completed only 20 trips and yet in the same rating bin has an 81.28% probability of reaching the target. This intuitively makes sense, since the first driver has only 20 trips left in which to raise his average while the second driver has 80 trips over in which to do so.

The tables are partitioned into various regions 808, 810, 812, which define driver screening criteria based on the boundary between the regions. The drivers in region 808 have very low probability (<10%) of reaching the target performance rating by 100 trips. These drivers are typically transitioned out of the driver population. The drivers in region 812 have a sufficiently high probability (>70%) of reaching the target performance rating by 100 and so no further actions are necessary to improve their performance. However, the drivers in region 810 may or may not reach the target performance rating by 100 trips, and thus, it is beneficial to provide additional training, incentives, or messages (by messaging module 170) during their trips in order to assist the drivers in obtaining better performance ratings.

In this illustrated example, the threshold between region 810 and region 812 is 70%. Using just table 800, which does not take ROAR into account, it appears that all drivers in region 812, bin 4.5× with between 50 and 75 trips have a sufficient (>70%) chance of obtaining the target performance rating.

Table 802 reflects the changes in the various regions once driver ROAR is taken into account. In this table, only drivers with low ROAR scores are considered. Here, using the same 70% threshold between the regions the extent of the middle region has changed to include region 814, which encompasses the rows for bin 4.5× with between 55 and 75 trips that were included in region 810 in table 800. Drivers in this region 814 are below the 70% threshold and thus less likely to meet the performance rating target. Without ROAR, this cohort of drivers could not be identified based their average performance ratings alone, as shown in table 800. The use of ROAR thus allows identification of additional drivers who may benefit from training, messaging or other remediation. In addition, the use of ROAR in the allows for the identification of a cohort of drivers in region 816; in the absence of ROAR drivers in this cohort appear to have a low but viable probability of reaching the performance rating target. With the inclusion of ROAR, these drivers are now identified as being unlikely to reach the target and can be transitioned out of the driver population.

Accordingly, in one embodiment, driver screening module 220 is configured with driver screening criteria, for example in the form of a screening table such as table 802 or equivalent rules, and program instructions that performs the following operations. The screening table includes rows for corresponding numbers of trips 803, and rating columns 805 corresponding to rating bins. A target average performance rating (e.g., 4.6) is specified for a target number of trips (e.g., 100). The cells are populated with probabilities (e.g., percentages), as explained above, of a driver at that number of trips meeting the target average performance rating by the target number of trips. Thresholds for the probabilities are selected to differentiate between low (unacceptable) probability (e.g., <10%), medium (acceptable) probability (e.g., 10-70%), and high (presumed) probability (>70%) values.

When the trip is completed, the trip management module 140 calls the driver screening module 220, passing in the driverID for the driver of the trip. The driver screening module 220 retrieves from the driver data store 184 the number of trips for the driver, the driver's ROAR factor, and the driver's average performance rating. The driver screening module 220 determines if the total number of trips for the driver matches one of the trip number bins, for example, doing a lookup of the number of trips in the trip count column. If the number of trips by the driver matches a row value, then the driver screen module 220 matches the driver's average performance rating to one cells in the rating columns, to obtain the probability of the driver obtaining a target performance rating by the target trip count. If the driver is in a high probability region according to the driver screening criteria separating the regions, no further action is taken. If the driver is in low probability region, a corresponding flag is set in the driver's record in the driver data store 184 indicating that the driver should be considered for transitioning off the of the transportation management system 130; additionally or alternatively, the driverID is added to a list of drivers to be so transitioned. If the driver is in acceptable probability region, a flag is set in the driver's record in the data store 184 indicating the driver should be selected for messages from the messaging module 170 to improve the probability of the driver obtaining a high rating from the riders. The messaging module 170 checks this flag during step 331 to determine whether to send messages to the driver.

Drivers identified by the driver screening module 220 may also be provided additional training in the form of classes, online videos or media, or other instructional material.

Implementation of the Predictive Model Generator and the Predictive Models

In one embodiment, the individual predictive models 230 are each preferably implemented as ensemble learners using a form of gradient boosting, as described in Friedman, J. H. "Greedy Function Approximation: A Gradient Boosting Machine," Annals of Statistics, v. 29, pp. 1189-1232 (2000), as modified and improved herein to provides the cascaded features. While gradient boosted may be applied to different underlying types of machine learning algorithms, in the preferred embodiments, the implementation of the predictive model generator 220 uses gradient boosted machines (GBM) with decisions trees (GBDT). A suitable implementation for the predictive model generator 220 is available in code packages such as H2O.gbm available from H2O.ai of Mountain View, Calif., or xgboost from xgboost developers.

As described above, each of the predictive models 230 is trained on a particular set of features taken from the trip, rider, and driver data stores 180, 182, and 184. Numerical features are used in their native form. Categorical or enumerated variables such as RiderEmployee, Service type, City and so forth may be encoded using 1-of-k encoding. Message and response lists (which are lists of categorical identifiers) may be encoded using 1-of-k encoding over the set of k identifiers for each list type if a single categorical identifier is allowed, or using a bit vector of length $2^k$ where multiple identifiers are allowed. The following model parameters produce suitable predictive models 230 (though other parameter values may be used as well):

Number of trees per model: 500-1000.

Tree size (interaction depth): 6.

Shrinkage (learning rate): Learning rates between 0.001 and 0.005. As appreciated by those of skill in the art, the selection of the number of trees and shrinkage involves tradeoffs in terms of model performance, computation time and memory. Lower learning rates provide generally improved model performance at a cost of longer computation time and larger memory requirements. The particular selection then of the number of trees and learning rate is an engineering decision.

Cross fold validation: five or ten folds may be used.

Loss function: The loss function used depends on whether the performance rating is treated as continuous feature (in which case the decision trees are regression trees) or a binary categorical feature (in which case the trees are classification trees). Nominally, the performance rating can be treated a continuous feature, in which case, the loss function selected is typically squared loss.

Figure 9:
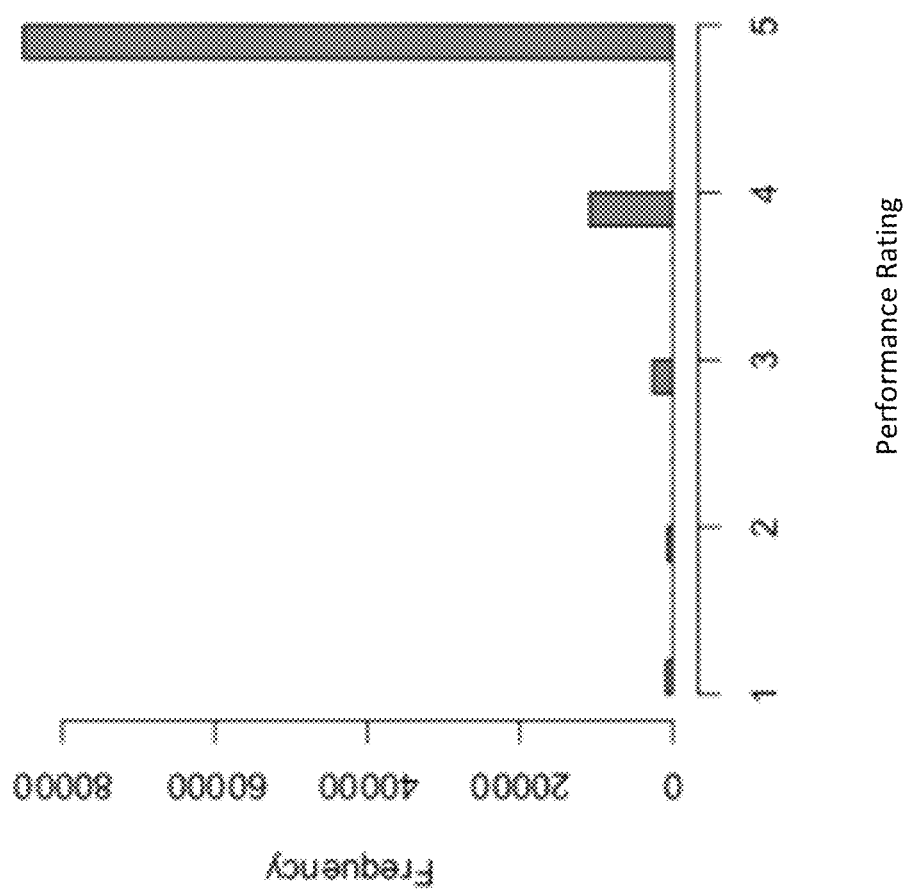
FIG. 9 illustrates a distribution of performance ratings, showing strong skewed characteristics.

In one embodiment, the performance rating may be treated as a binary categorical variable (0,1) where 1 indicates a maximal performance rating (e.g., 5 on a 1 to 5 scale) and 0 indicates any submaximal rating (e.g., rating <5). This embodiment is appropriate where the distribution of performance ratings as binary distributive characteristics, rather than a normal distribution. For example, FIG. 9 illustrates an example chart showing the distribution of ratings on a 1 to 5 scale over 100,000 randomly selected trips in a given city. As shown here, maximal ratings (5) are heavily weighted, relative to non-maximal (1-4) ratings. Under these conditions, the ratings can be considered categorical and binary. In other distributions, the rating may be considered categorical and multinomial (e.g. ratings 1-2, 3, and 4-5), for example.

In embodiments using a binary categorical treatment of the performance rating, the loss function used is a surrogate for classification error rate, with exponential and logistic loss functions particularly common. Where the performance rating is treated as categorical variable, the positive and negative instances are preferably reweighted so that the total weight for each class of instances is the same when input into the next tree, rather than unequally reweighted to emphasize negative cases, as in conventional approaches.

Figure 10:
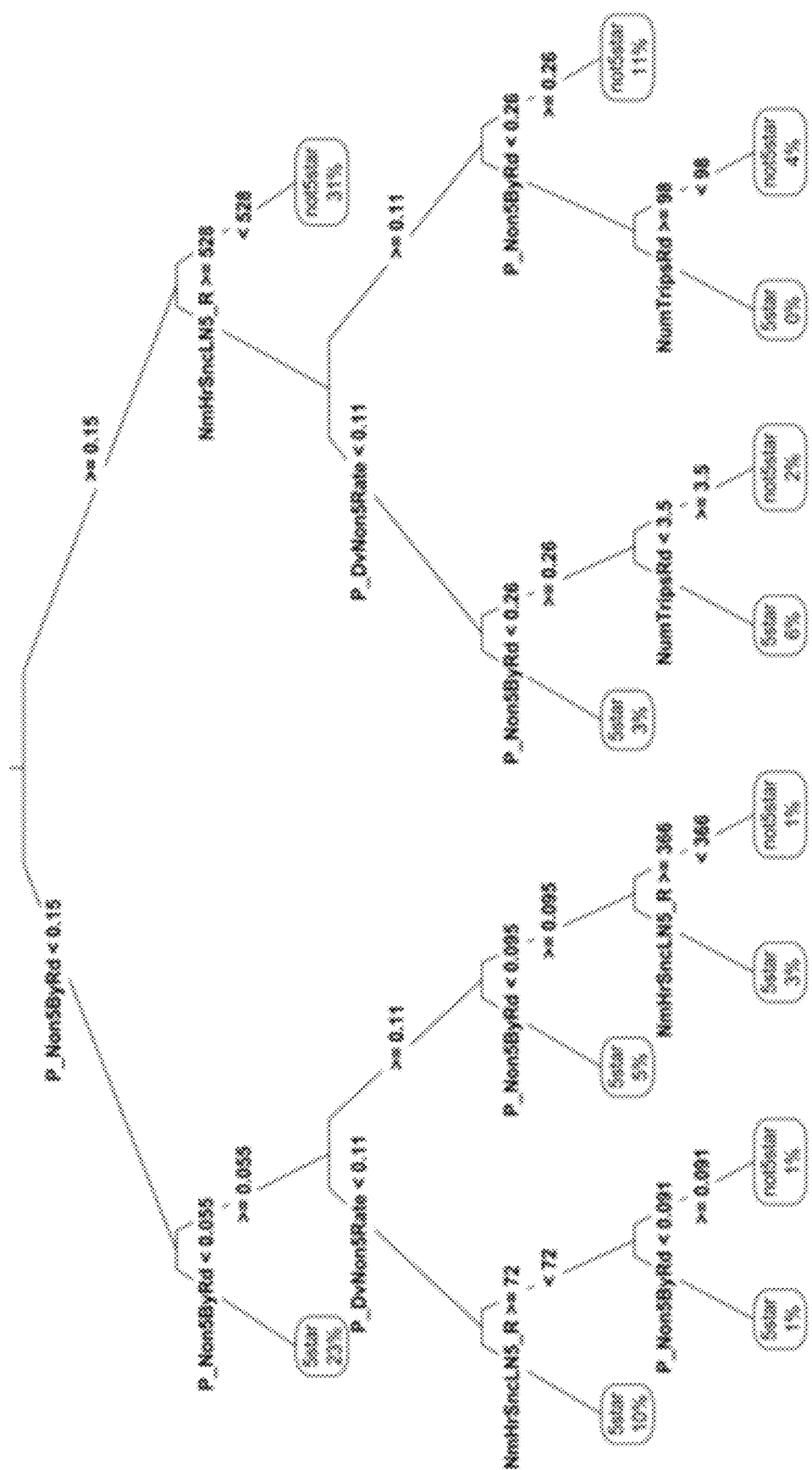
FIG. 10 illustrates an example of a predictive model in the form of a decision tree.

FIG. 10 illustrates an example of a predictive model 230A, in the form of a decision tree, as generated by the predictive model generator 220, from the observed exogenous variables, and provides an example of the explanatory power of the cascaded approach. In this figure, the variable names are indicate and generally descriptive. The token "5" indicates a "satisfactory" rating, 'Rd" is rider. Thus "P_Non5byRd" is probability (e.g., frequency) of non-satisfactory rating by rider. In predictive model 230A, three important variables are found to be the probability of a non-maximal rating by the rider (P_Non5byRd), the number of hours since the last non-maximal rating by the rider (NmHrsSncLNS_R), and the probability of non-maximal rating the driver received before (P_Dvnon5Rate) If P_Non5byRd is larger than 0.15, then NmHrsSncLNS_R is tested; and if NmHrsSncLNS_R is very large (>=528), then P_DvNon5Rate is tested; if P_DvNon5Rate is larger than 0.11 and P_Non5byRd is larger than 0.26, then the trip is likely to be rated low. On the other hand, if P_Non5byRd is less than 0.15, then the model evaluates it again; if it is even smaller than 0.055, then model predicts the trip is likely to be rated maximally. Thus, these variables are the most significant in this predictive model 230A. When analyzed in combination with the decision trees from the multiple different predictive models 230B, 230C, and 230D, the most significant variables for each of the different types of variables can be readily identified and described. This allows the system administrator to selectively control and change the operation of the system (e.g., change the way driver's interact with riders, what protocols they follow during a ride, what messages they receive during a ride, driving training, and so forth) to ideally result in overall improved system performance.

Figure 11:
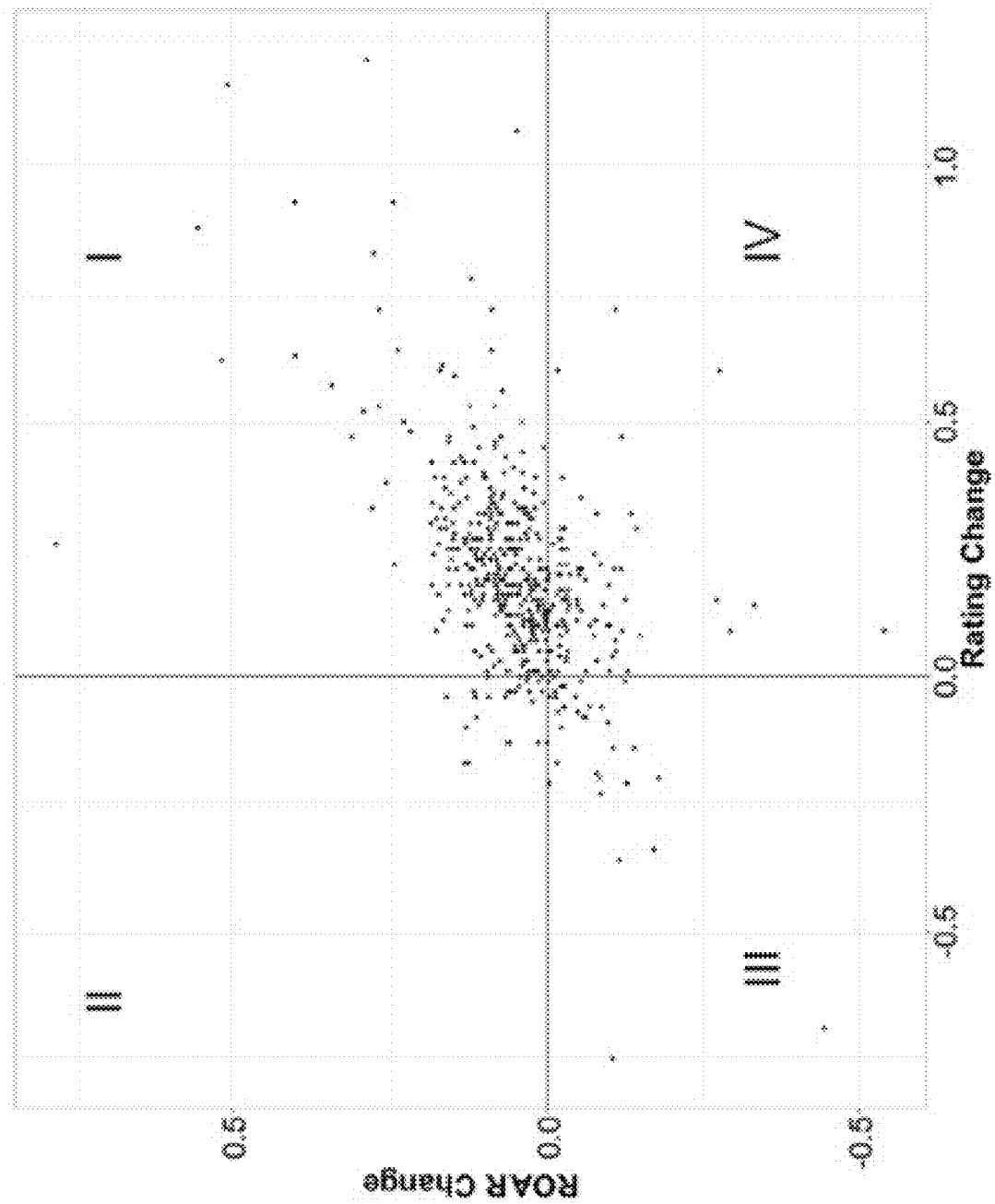
FIG. 11 illustrates the relationship between the change in driver ROAR relative to change in driver's average rating.

FIG. 11 illustrates the relationship between the change in driver ROAR relative to change in driver's average rating, in response to driver messaging and education. As shown here, there is generally positive correlation between improvements in driver's average ratings and improvements in driver ROAR, indicating that ROAR is useful in identifying drivers whose performance ratings can be improved by messaging or other driver improvement actions.

Observations and Discoveries

The use of cascaded boosted predictive models, and their ability to separately identify significant variables among different types of features, has resulted in certain unanticipated discoveries about the relative importance of features in contributing to performance ratings and driver ROAR factors. As mentioned above, the exogenous variables and the F1 component predicted by the first predictive model 230A provide the dominant contribution to a driver's performance rating, with actual driver performance, as reflected in ROAR contributing less so. After model development over a large selection of features, the following features have been identified as most significantly contributing to performance ratings in terms of the exogenous variables.

Rider's historical rating behavior: the historical average of a given rider's ratings of drivers is the strongest predictor of future ratings given. That is to say, riders tend to be internally consistent with respect to their ratings, for example, being "hard" or "easy" raters. This is an important finding because it means that a significant contributor to an individual driver's rating is the internal biases of the rider, which by definition are beyond the control of any given driver. Moreover, a second order, more subtle implication is that the performance of other drivers over time contributes significantly to a particular driver's rating.

Rider's short-term experience: a rider's short-term experience is an important factor to driver rating. Riders who gave non-maximal ratings recently have larger probability of providing a non-maximal rating to the next driver.

Historical cancellation rate of rider: Another finding is that the riders who have a significant cancellation rate have a higher probability of providing a non-maximal rating to a driver.

Rider is employee of transportation management system: Another finding is that the riders who are employees of the transportation management system are more likely to provide a higher rating to a driver than non-employees.

Again, it is important to remember that these variables are those entirely outside the control of a driver in any given trip, and yet heavily impact the rider's rating of the driver's performance.

Two variables that are within the driver's control to some extent have also been found significant. These are:

Historical tickets related to quality and safety of driver: A driver's historical number of tickets is positively correlated with an increased probability of a non-maximal rating. This relationship is not necessarily expected, because only a very small number, if any, of riders will be present at the time a driver receives a traffic ticket. Nonetheless, to the extent that a driver drives in a manner that has resulted in a significant number of tickets historically, that driver appears likely to drive in a manner that appears unsafe to riders, leading to lower overall ratings.

Speed: As a driver's speed behavior (average speed relative to average observed speeds in designated areas) is either significantly above or significantly below observed speeds, the likelihood of a non-maximal rating increases.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program instructions which can be executed by a computer processor for performing any or all of the steps operations or processes described.

Embodiments of the invention may also relate to an apparatus for performing the operations herein. This apparatus may be specially constructed for the required purposes and/or it may comprise a general-purpose computing device selectively activated or reconfigured by a computer program (e.g., computer executable instructions) stored in the computer. Such a computer program may be stored in a non-transitory tangible computer readable storage medium or any type of media suitable for storing program instructions which may be coupled to a computer system bus. Furthermore any computing systems referred to in the specification may include a single processor or may be architectures employing multiple processor designs for increased computing capability.

Embodiments of the invention may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

We claim:

1. A machine learning system, comprising:
   one or more processors; and
   a trip data store comprising a plurality of historical trip records, each trip record characterizing attributes of an observed trip associated with a rider and a driver, each trip record comprising:
      a plurality of observed exogenous variables associated with the rider, the driver and the trip, wherein the value of each exogeneous variable is known prior to the start of the trip;
      a plurality of observed endogenous variables associated with the rider, the driver and the trip, wherein the value of each endogenous variable is known after the start of the trip;
      a plurality of elicited endogenous variables associated with the rider, the driver and the trip, wherein the value of each elicited endogenous variable is elicited from the driver or the rider during or after the trip;
      an observed dependent variable for the driver provided by the rider for the trip after the trip is completed;
   one or more memory resources storing instructions that, when executed by the one or more processors, cause the one or more processors to perform steps comprising:
      identifying a set of trip records associated with a driver;

executing a first predictive model to predict a first rating component of a predicted output variable for the driver, the first predictive model receiving as inputs the observed exogenous variables associated with each of the set of trips associated with the driver;

executing a second predictive model to predict a second rating component of the predicted output variable for the driver, the second predictive model receiving as inputs the observed endogenous variables associated with each of the set of trips associated with the driver;

executing a third predictive model to predict a third rating component of the predicted output variable for the driver, the third predictive model receiving as inputs the elicited endogenous variables associated with each of the set of trips associated with the driver;

determining, for each trip in the set of trips associated with the driver, a residual value as a difference between the observed dependent variable associated with the trip, the first rating component, the second rating component, and the third rating component;

generating the predicted output variable for the driver by combining the residual value of each trip in the set of trips associated with the driver, wherein the contribution to the combination from each of the trips is weighted according to a weighting factor assigned to the trip; and responsive to the predicted output variable for the driver indicating that the driver is unlikely to meet performance rating goals, determining that the driver needs additional training to improve performance.

2. The system of claim 1, wherein:

a trip record includes a plurality of experimental endogenous variables associated with the rider, the driver and the trip;

the instructions further cause the one or more processors to perform steps comprising:

executing a fourth predictive model to predict an experimental component of the predicted output variable for the driver, the fourth predictive model receiving as inputs the experimental endogenous variables associated with each of the set of trips associated with the driver; and wherein generating the residual value further comprises subtracting the value of the experimental component of the predicted output variable from the difference between the observed dependent variable associated with the trip, the first rating component, the second rating component, and the third rating component.

3. The system of claim 1, wherein the instructions further cause the one or more processors to perform steps comprising:

automatically transmitting one or more messages to a driver during a trip, wherein the messages contain instructions for behaviors by the driver to improve a likelihood of the driver receiving a higher performance rating at the completion of the trip;

storing a set of driver screening criteria indicating threshold probability levels for a driver to obtain a target average performance rating by a target number of rated trips provided by the driver, wherein the threshold probability levels are determined with respect to a set of drivers having values of the performance contribution factor below a predetermined level, and wherein the driver screening criteria include a minimum probability threshold value and a maximum probability threshold value;

determining for a driver, based on number of trips made by the driver and the driver's average performance rating, the probability of the driver obtaining the target average performance rating by the target number of trips;

comparing the determined probability for the driver with the driver screening criteria; and responsive to the determined probability for the driver being between the minimum and maximum threshold probability values of the driver screening criteria, storing an indication for the messaging module to automatically transmit at least one message to a rider during a subsequent trip made by the driver.

4. The system of claim 1, wherein each of the predictive models is a gradient boosted decision tree classifier.

5. A machine learning method, comprising:

storing in a trip data store a plurality of historical trip records, each trip record characterizing attributes of an observed trip associated with a rider and a driver, each trip record comprising:

a plurality of observed exogenous variables associated with the rider, the driver and the trip, wherein the value of each exogeneous variable is known prior to the start of the trip;

a plurality of observed endogenous variables associated with the rider, the driver and the trip, wherein the value of each endogenous variable is known after the start of the trip;

a plurality of elicited endogenous variables associated with the rider, the driver and the trip, wherein the value of each elicited endogenous variable is elicited from the driver or the rider during or after the trip;

an observed dependent variable for the driver provided by the rider for the trip after the trip is completed; and identifying a set of trip records associated with a driver;

executing a first predictive model to predict a first rating component of a predicted output variable for the driver, the first predictive model receiving as inputs the observed exogenous variables associated with each of the set of trips associated with the driver;

executing a second predictive model configured to predict a second rating component of the predicted output variable for the driver, the second predictive model receiving as inputs the observed endogenous variables associated with each of the set of trips associated with the driver;

executing a third predictive model configured to predict a third rating component of the predicted output variable for the driver, the third predictive model receiving as inputs the elicited endogenous variables associated with each of the set of trips associated with the driver;

determining, for each trip in the set of trips associated with the driver, a residual value as a difference between the observed dependent variable associated with the trip, the first rating component, the second rating component, and the third rating component;

generating the predicted output variable for the driver by combining the residual value of each trip in the set of trips associated with the driver, wherein the contribution to the combination from each of the trips is weighted according to a weighting factor assigned to the trip; and responsive to the predicted output variable for the driver indicating that the driver is unlikely to meet performance rating goals, determining that the driver needs additional training to improve performance.

6. The method of claim 5, wherein:
a trip record includes a plurality of experimental endogenous variables associated with the rider, the driver and the trip;
the method further comprising:
executing a fourth predictive model to predict an experimental component of the predicted output variable for the driver, the fourth predictive model receiving as inputs the experimental endogenous variables associated with each of the set of trips associated with the driver; and
wherein generating the residual value further comprises subtracting the value of the experimental component of the predicted output variable from the difference between the observed dependent variable associated with the trip, the first rating component, the second rating component, and the third rating component.

7. The method of claim 5, further comprising:
automatically transmitting one or more messages to a driver during a trip, wherein the messages contain instructions for behaviors by the driver to improve a likelihood of the driver receiving a higher performance rating at the completion of the trip;
storing a set of driver screening criteria indicating threshold probability levels for a driver to obtain a target average performance rating by a target number of rated trips provided by the driver, wherein the threshold probability levels are determined with respect to a set of drivers having values of the performance contribution factor below a predetermined level, and wherein the driver screening criteria include a minimum probability threshold value and a maximum probability threshold value;
determining for a driver, based on number of trips made by the driver and the driver's average performance rating, the probability of the driver obtaining the target average performance rating by the target number of trips;
comparing the determined probability for the driver with the second entity screening criteria; and
responsive to the determined probability for the driver being between the minimum and maximum threshold probability values of the driver screening criteria, storing an indication for the messaging module to automatically transmit at least one message to a rider during a subsequent trip made by the driver.

8. The method of claim 5, wherein each of the predictive models is a gradient boosted decision tree classifier.

9. A non-transitory computer readable medium storing instructions, that when executed by one or more processors, cause the one or more processors to perform steps comprising:
storing in a trip data store a plurality of historical trip records, each trip record characterizing attributes of an observed trip associated with a rider and a driver, each trip record comprising:
a plurality of observed exogenous variables associated with the rider, the driver and the trip, wherein the value of each exogenous variable is known prior to the start of the trip;
a plurality of observed endogenous variables associated with the rider, the driver and the trip, wherein the value of each endogenous variable is known after the start of the event;
a plurality of elicited endogenous variables associated with the rider, the driver and the trip, wherein the value of each elicited endogenous variable is elicited from the driver or the rider during or after the event;
an observed dependent variable for the driver provided by the rider for the trip after the trip is completed;
executing a first predictive model to predict a first rating component of a predicted output variable for the driver, the first predictive model receiving as inputs the observed exogenous variables associated with each of the set of trips associated with the driver;
executing a second predictive model to predict a second rating component of the predicted output variable for the driver, the second predictive model receiving as inputs the observed endogenous variables associated with each of the set of trips associated with the driver;
executing a third predictive model to predict a third rating component of the predicted output variable for the driver, the third predictive model receiving as inputs the elicited endogenous variables associated with each of the set of trips associated with the driver;
determining, for each trip in the set of trips associated with the driver, a residual value as a difference between the observed dependent variable associated with the trip, the first rating component, the second rating component, and the third rating component;
generating the predicted output variable for the driver by combining the residual value of each trip in the set of trips associated with the driver, wherein the contribution to the combination from each of the trips is weighted according to a weighting factor assigned to the trip; and
responsive to the predicted output variable for the driver indicating that the driver is unlikely to meet performance rating goals, determining that the driver needs additional training to improve performance.

10. The non-transitory computer readable medium of claim 9, wherein:
a trip record includes a plurality of experimental endogenous variables associated with the rider, the driver and the event;
the instructions further cause the one or more processors to perform steps comprising:
executing a fourth predictive model to predict an experimental component of the predicted output variable for the driver, the fourth predictive model receiving as inputs the experimental endogenous variables associated with each of the set of trips associated with the driver; and
wherein generating the residual value further comprises subtracting the value of the experimental component of the predicted output variable from the difference between the observed dependent variable associated with the trip, the first rating component, the second rating component, and the third rating component.

11. The non-transitory computer readable medium of claim 9, wherein the instructions further cause the one or more processors to perform steps comprising:
automatically transmitting one or more messages to a driver during an event, wherein the messages contain instructions for behaviors by the driver to improve a likelihood of the second entity receiving a higher performance rating at the completion of the event;

storing a set of driver screening criteria indicating threshold probability levels for a driver to obtain a target average performance rating by a target number of rated trips provided by the driver, wherein the threshold probability levels are determined with respect to a set of second entities having values of the performance contribution factor below a predetermined level, and wherein the driver screening criteria include a minimum probability threshold value and a maximum probability threshold value;

determining for a driver, based on number of trips made by the driver and the driver's average performance rating, the probability of the driver obtaining the target average performance rating by the target number of trips;

comparing the determined probability for the driver with the driver screening criteria; and responsive to the determined probability for the driver being between the minimum and maximum threshold probability values of the driver screening criteria, storing an indication for the messaging module to automatically transmit at least one message to a rider during a subsequent trip made by the second entity.

12. The non-transitory computer readable medium of claim 9, wherein each of the predictive models is a gradient boosted decision tree classifier.

13. The system of claim 1, wherein the instructions further cause the one or more processors to perform steps comprising:

determining based on the predicted output variable for the driver, whether the driver receives a subsequent trip request.

14. The system of claim 1, wherein the instructions further cause the one or more processors to perform steps comprising:

selecting based on the predicted output variable for the driver, a message for the driver comprising information for increasing the likelihood of the driver receiving a higher performance rating score; and sending the message to the driver before, during or after a subsequent trip.

15. The method of claim 5, further comprising:

determining based on the predicted output variable for the driver, whether the driver receives a subsequent trip request.

16. The method of claim 5, further comprising:

selecting based on the predicted output variable for the driver, a message for the driver comprising information for increasing the likelihood of the driver receiving a higher performance rating score; and sending the message to the driver before, during or after a subsequent trip.

17. The non-transitory computer-readable medium of claim 9, wherein the instructions further cause the one or more processors to perform steps comprising:

determining based on the predicted output variable for the driver, whether the driver receives a subsequent trip request.

18. The non-transitory computer-readable medium of claim 9, wherein the instructions further cause the one or more processors to perform steps comprising:

selecting based on the predicted output variable for the driver, a message for the driver comprising information for increasing the likelihood of the driver receiving a higher performance rating score; and sending the message to the driver before, during or after a subsequent trip.

\* \* \* \* \*